United States Patent
Wang et al.

(10) Patent No.: US 12,233,907 B1
(45) Date of Patent: Feb. 25, 2025

(54) VEHICLE DOOR STATE DETECTION

(71) Applicant: Zoox, Inc., Foster City, CA (US)

(72) Inventors: Xin Wang, Sunnyvale, CA (US); Yi Xu, Pasadena, CA (US)

(73) Assignee: Zoox, Inc., Foster City, CA (US)

( * ) Notice: Subject to any disclaimer, the term of this patent is extended or adjusted under 35 U.S.C. 154(b) by 391 days.

(21) Appl. No.: 17/320,630

(22) Filed: May 14, 2021

Related U.S. Application Data

(60) Provisional application No. 63/117,263, filed on Nov. 23, 2020, provisional application No. 63/028,377, filed on May 21, 2020.

(51) Int. Cl.
| | |
|---|---|
| *B60W 60/00* | (2020.01) |
| *B60W 30/09* | (2012.01) |
| *G06N 20/00* | (2019.01) |
| *G06V 20/56* | (2022.01) |

(52) U.S. Cl.
CPC ........ *B60W 60/0018* (2020.02); *B60W 30/09* (2013.01); *B60W 60/0017* (2020.02); *G06N 20/00* (2019.01); *G06V 20/56* (2022.01); *B60W 2420/403* (2013.01)

(58) Field of Classification Search
CPC ............. B60W 60/0018; B60W 30/09; B60W 60/0017; B60W 2420/42; G06N 20/00; G06V 20/56
See application file for complete search history.

(56) References Cited

U.S. PATENT DOCUMENTS

| | | | |
|---|---|---|---|
| 10,967,824 B1 | 4/2021 | Pertsel | |
| 11,048,927 B2 | 6/2021 | Russell | |
| 11,074,438 B2 | 7/2021 | Mangalam | |
| 11,138,446 B2 | 10/2021 | Kim | |
| 11,167,756 B2 | 11/2021 | Shalev-Shwartz | |
| 11,226,626 B1 | 1/2022 | Silver | |
| 11,420,855 B2 | 8/2022 | Ishizaki | |
| 11,427,195 B1 * | 8/2022 | Pertsel | ............ B60R 1/00 |
| 2010/0191391 A1 | 7/2010 | Zeng | |

(Continued)

FOREIGN PATENT DOCUMENTS

| | | |
|---|---|---|
| CN | 110858295 B | 4/2021 |
| CN | 113453970 | 9/2021 |

OTHER PUBLICATIONS

Office Action for U.S. Appl. No. 17/246,016, mailed on Nov. 30, 2023, Kratarth Goel, "Key Point Detection", 11 pages.

(Continued)

*Primary Examiner* — Hussein Elchanti
*Assistant Examiner* — Micah Chuen-Him Cheng
(74) *Attorney, Agent, or Firm* — Lee & Hayes, P.C.

(57) ABSTRACT

Techniques for detecting door states associated with vehicles in an environment are described herein. The techniques may include receiving sensor data associated with a first vehicle in an environment and inputting the sensor data into a machine-learned model that is configured to determine a state of a door of the first vehicle. Based on the input data, an output may be received from the machine-learned model that indicates the state of the door of the first vehicle. Based on the state of the door of the first vehicle, a trajectory of a second vehicle may be controlled. The techniques may also include training the machine-learned model to detect door states of vehicles.

20 Claims, 9 Drawing Sheets

(56) References Cited

U.S. PATENT DOCUMENTS

| | | |
|---|---|---|
| 2016/0144867 A1 | 5/2016 | Delp |
| 2017/0074000 A1* | 3/2017 | Banvait .............. G07C 9/00571 |
| 2017/0206464 A1 | 7/2017 | Clayton et al. |
| 2019/0049987 A1 | 2/2019 | Djuric et al. |
| 2019/0359208 A1 | 11/2019 | Sapp |
| 2019/0384303 A1* | 12/2019 | Muller ................... G05D 1/027 |
| 2020/0026286 A1* | 1/2020 | Vozar ...................... H04W 4/40 |
| 2020/0079371 A1* | 3/2020 | Sakamoto .............. G06V 40/20 |
| 2020/0110175 A1 | 4/2020 | Chen |
| 2020/0160537 A1 | 5/2020 | Urtasun et al. |
| 2020/0202209 A1* | 6/2020 | Mao ..................... G06V 10/774 |
| 2020/0210721 A1 | 7/2020 | Goel |
| 2020/0250553 A1 | 8/2020 | Tomaru |
| 2020/0293064 A1* | 9/2020 | Wu ............................ G06T 7/20 |
| 2020/0307562 A1 | 10/2020 | Ghafarianzadeh et al. |
| 2020/0307563 A1 | 10/2020 | Ghafarianzadeh et al. |
| 2020/0357174 A1 | 11/2020 | Banerjee |
| 2021/0094577 A1* | 4/2021 | Shalev-Shwartz ........................... B60W 30/0953 |
| 2021/0245744 A1 | 8/2021 | Mangalam |
| 2021/0271866 A1 | 9/2021 | Hayakawa |
| 2021/0304514 A1* | 9/2021 | Croxford ............... G06V 20/20 |
| 2022/0027642 A1* | 1/2022 | Shambik .............. G05D 1/0246 |
| 2022/0066456 A1 | 3/2022 | Ebrahimi Afrouzi et al. |
| 2022/0171065 A1 | 6/2022 | Li et al. |

OTHER PUBLICATIONS

Office Action for U.S. Appl. No. 17/320,678, mailed on Oct. 31, 2023, Oytun Ulutan, "Pedestrian Attribute and Gesture Detection", 18 pages.

Office Action for U.S. Appl. No. 18/205,651, mailed on Jan. 5, 2024, Oytun Ulutan, "Machine-Learned Model Training for Pedestrian Attribute and Gesture Detection", 20 pages.

Office Action for U.S. Appl. No. 17/320,690, mailed on Aug. 3, 2022, Ultan, "Machine-Learned Model Training for Pedestrian Attribute and Gesture Detection", 26 pages.

* cited by examiner

VEHICLE DOOR STATE DETECTION

PRIORITY

This application claims priority to U.S. Provisional Application No. 63/028,377, filed May 21, 2020, which is incorporated herein by reference in its entirety and for all purposes. Additionally, this application claims priority to U.S. Provisional Application No. 63/117,263, filed Nov. 23, 2020, which is incorporated herein by reference in its entirety and for all purposes.

BACKGROUND

Computer vision is used in applications such as autonomous vehicle operation, identifying individuals for security purposes, and performing manufacturing and industrial tasks, etc. Computer vision techniques may use sensors to capture data of an environment and use this sensor data to detect and identify objects in the environment. Such techniques may utilize processors and associated memories, including various models, algorithms, and/or machine-learning algorithms to perform object detection and identification.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
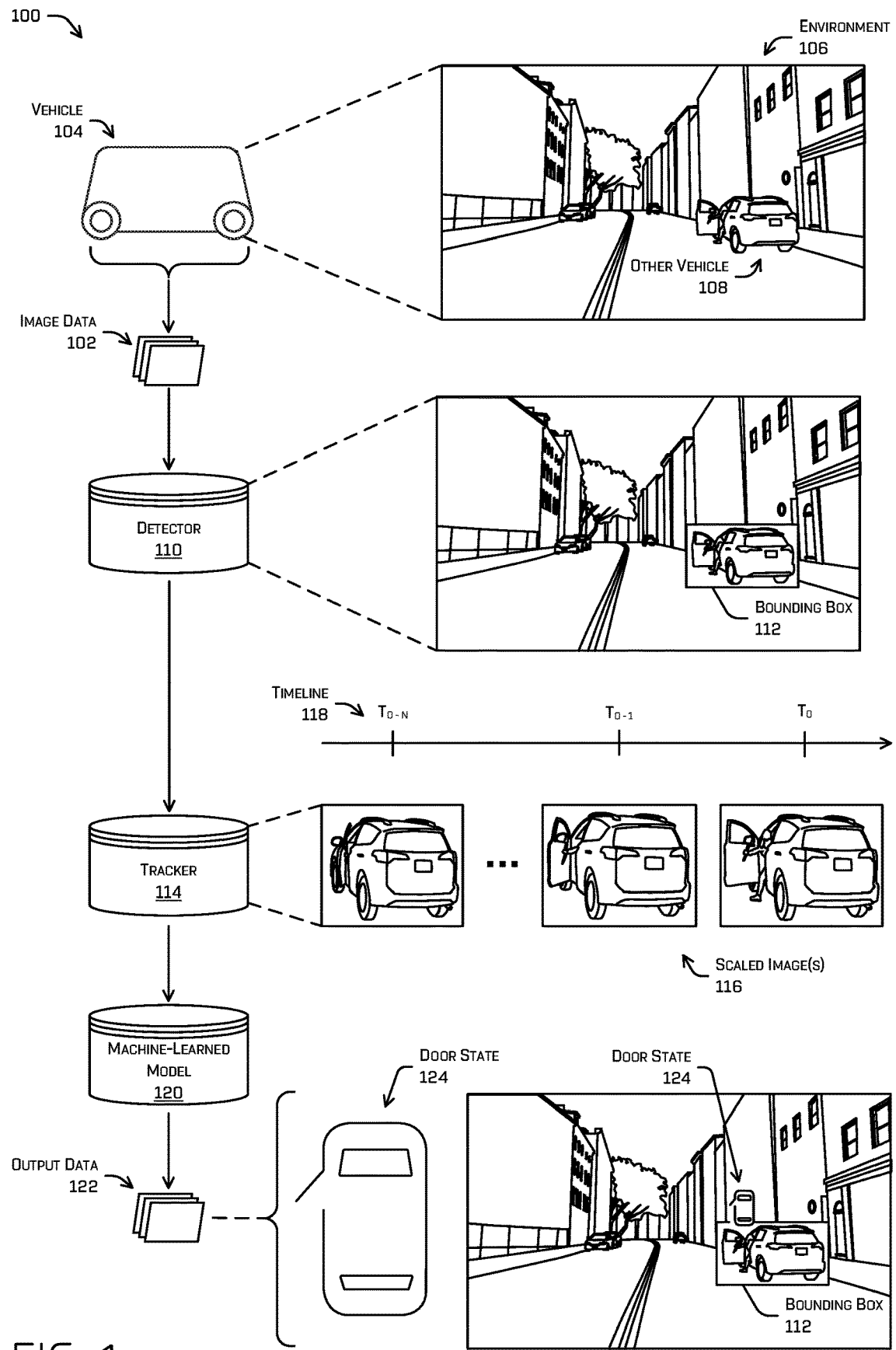
FIG. 1 is a pictorial flow diagram illustrating an example data flow that is associated with detecting a door state of a vehicle based on image data.

Techniques for detecting door states of vehicles are described herein. As discussed above, computer vision is used in applications such as autonomous vehicle operation, identifying individuals for security purposes, and performing manufacturing and industrial tasks, etc. Computer vision techniques may use sensors to capture data of an environment and use this sensor data to detect and identify objects in the environment. Such techniques may utilize processors and associated memories, including various models, algorithms, and/or machine-learning algorithms to perform object detection and identification. For instance, machine-learned models may be trained to identify and predict characteristics of an object detected in a physical environment based on sensor data.

However, in some cases these machine-learned models may not accurately detect certain information that can be used to make informed decisions in a high-risk environment. Take, for example, operating an autonomous vehicle in an environment in which other vehicles are present. The autonomous vehicle may rely on one or more machine-learned model(s) in order to traverse the environment safely. However, if the machine-learned model(s) is/are not trained to detect certain types of relevant information associated with objects in the environment, the risk that the autonomous vehicle may make an uninformed and potentially unsafe decision may be increased.

Take, for example, a scenario in which a vehicle is driving on a street where vehicles are parked on the side of the street (e.g., parallel parked). If a driver of the vehicle observes that a door of one of the parked vehicles is open, the driver may control the vehicle out of precaution for the open door. For instance, the driver may change lanes to give the parked vehicle more space, decelerate to allow more time to make a quick decision, bring the vehicle to a stop, and/or the like. For an autonomous vehicle, one or more computers can act as a driver of the vehicle. As such, it can be critical that machine-learned or other model(s) used by autonomous vehicles are configured to detect when a door of a parked vehicle is open, as well as other states of the door (e.g., opening, closing, closed, etc.), in order to traverse an environment safely.

Accordingly, this disclosure describes various techniques for detecting door states of vehicles using machine-learned models and, based at least in part on the detected door states, controlling the operation of a vehicle (e.g., cause the vehicle to accelerate, decelerate, stop, turn, veer, change trajectory, etc.). For instance, sensor data captured by a sensor of the vehicle may be input into a machine-learned model that is configured to detect a state of a door of another vehicle (e.g., determine whether the door is open, closed, opening, closing, partially open, partially closed, etc.). The machine-learned model may generate an output indicating the state of the door based on the input sensor data. Based at least in part on the output, the vehicle may be controlled such that, for example, a trajectory may be selected or otherwise determined for the vehicle to follow such that a distance between the vehicle and the other vehicle can be increased.

Among other things, the techniques described in this disclosure improve the operation of vehicles by accurately detecting door states so that a vehicle may traverse an environment more safely. For instance, the described techniques may be used to determine whether a door of a parked vehicle is opening so that a moving vehicle may avoid the door of the parked vehicle. Additionally, the described techniques may be used to determine predicted locations of pedestrians based at least in part on detecting a state of a door. For example, if a door of a vehicle is detected to be in an open state at a first time, a pedestrian may be predicted to be located proximate the door at a second time. These and other improvements will be readily apparent to those having skill in the art.

By way of example, and not limitation, a method according to the various techniques disclosed herein may include receiving sensor data representing a first vehicle. In some examples, the sensor data may be captured and/or generated by one or more sensor(s) of a second vehicle that may be operating in an environment. For instance, the sensor data may comprise image data, lidar data, radar data, and/or the like. In at least one example, the sensor data includes first sensor data representing the first vehicle at a first time, second sensor data representing the first vehicle at a second time, and Nth sensor data representing the first vehicle at an Nth time (where N represents any number greater than or equal to one). Additionally, or alternatively, the sensor data may represent an environment in which the second vehicle operates, and the first vehicle may be located within the environment.

In some examples, an indication of a contextual feature associated with the first vehicle may also be received, in addition to the sensor data. Additionally, or alternatively, the contextual feature may be determined by, for instance, a computing device associated with the second vehicle. The contextual feature may include, in some instance, one or more of a speed of the first vehicle, a location of the first vehicle, an orientation of the first vehicle, a state of the first vehicle (e.g., parked, moving, etc.), whether the first vehicle is positioned in a parking space or lane, a vehicle type associated with the first vehicle (e.g., sedan, sport-utility-vehicle, truck, van, bus, etc.), a size of the first vehicle, and/or the like.

In some examples, the method may also include inputting the sensor data into a machine-learned model that is configured to determine a state associated with a door of the first vehicle. For instance, the machine-learned model may be configured to analyze the sensor data (e.g., by performing one or more convolutions on the sensor data) to determine whether one or more doors of the first vehicle are open, closed, opening, closing, etc. In at least one example in which the sensor data includes the first sensor data, the second sensor data, and the Nth sensor data, the method may include inputting the first sensor data into the machine-learned model at a first time, inputting the second sensor data into the machine-learned model at a second time, and inputting the Nth sensor data into the machine-learned model at an Nth time. Alternatively, or additionally, the method may include inputting the first sensor data, the second sensor data, and the Nth sensor data into the machine-learned model simultaneously or substantially simultaneously. In at least one example, data indicating the one or more contextual features may additionally be input into the machine-learned model.

In some examples, the machine-learned model may include a first portion (e.g., a backbone, such as a convolutional neural network (CNN) backbone) that may be configured to determine and/or generate one or more feature vectors based at least in part on sensor data inputs. Additionally, the machine-learned model may include a second portion (e.g., a machine-learned model head) that may be configured to determine and/or generate the output based at least in part on the one or more feature vectors determined and/or generated by the first portion of the machine-learned model. The first portion of the machine-learned model and the second portion of the machine-learned model may each perform one or more convolutions or other processes or subprocesses to generate the output. For instance, the first portion and/or the second portion of the machine-learned model may perform one or more 2D and/or 3D convolutions on the image data.

In several examples, the method may include receiving an output from the machine-learned model. The output may indicate a state associated with a door of the first vehicle. For instance, the output may indicate that the door of the first vehicle is open, closed, opening, closing, or the like. Additionally, in some examples the output may indicate multiple states associated with multiple doors of the first vehicle. For instance, the output may indicate that a first door of the first vehicle (e.g., driver door) and a second door of the first vehicle (e.g., passenger door, rear door, etc.) are open, closed, opening, closing, etc. In even further examples, the output may indicate multiple states associated with multiple doors of multiple vehicles (e.g., a first door of the first vehicle is open, and a second door of a third vehicle is open).

In at least one example, the machine-learned model may determine and/or generate the output based at least in part on the data indicating the one or more contextual features associated with the first vehicle. In an additional, or alternative example, the output may further indicate a distance the door protrudes from the first vehicle, and the method may include determining whether the distance is less than a maximum distance in which the door is capable of protruding from the first vehicle.

In at least one example, a predicted location of a pedestrian may be determined based at least in part on the output of the machine-learned model. For instance, if the output indicates that a door of the first vehicle is opening at a first time, then the predicted location of the pedestrian at a second time may be determined, and the predicted location may be proximate the door. In other words, if the door of the first vehicle is opening, it may be likely that the pedestrian will exit the vehicle through that door and be positioned near the door at some future time. As another example, if a first door and a second door of the first vehicle are open and/or opening, and the pedestrian is proximate the first door at a first time, the method may include determining that the pedestrian is to be proximate the second door at a second time. For instance, if the driver door and the rear door (e.g., trunk, hatch, etc.) are open or opening, and the pedestrian is proximate the driver door at the first time, then it may be likely that the pedestrian may be proximate the rear door at a second, later time.

In some examples, a cost may be determined and associated with the first vehicle based at least in part on the output. The cost may represent a risk associated with the first vehicle, an object cost associated with the first vehicle, and/or the like. For instance, a risk that a pedestrian may exit the first vehicle may be represented by the cost. As another example, the cost may represent a risk that the door of the first vehicle presents to the second vehicle (e.g., whether the second vehicle may have a collision with the door if the second vehicle does not change its trajectory). Additionally, the cost may be associated with which side of the first vehicle the door is open (e.g., street side, curb side, trunk, etc.), how long the door has been open, how far open the door is (e.g., fully open, partially opened, opening, etc.).

In various examples, the method may include controlling a second vehicle (e.g., the second vehicle that captured the sensor data) based at least in part on the output. For instance, based at least in part on the output indicating the state of the door of the first vehicle, a trajectory for the second vehicle to follow may be determined and/or selected. In some examples, the trajectory may be associated with increasing a distance between the first vehicle and the second vehicle based at least in part on the state of the door. Additionally, or alternatively, the trajectory may be associated with accelerating or decelerating the vehicle based at least in part on the state of the door of the first vehicle. In at least one example, the second vehicle may be controlled based at least in part on the predicted location of the pedestrian, the maximum distance in which the door of the first vehicle may be capable of protruding, and the like.

In some examples, an indication of a gesture of a pedestrian may be received and/or determined, and the second vehicle may be controlled based at least in part on the gesture of the pedestrian and the door state of the first vehicle. For instance, the machine-learned model or another machine-learned model associated with the second vehicle may be trained to detect gestures of pedestrians based on sensor data, the gestures indicative of whether the vehicle should stop, go, turn, veer left, veer right, slow down, speed up, etc. Take, for example, a scenario in which the pedestrian is about to exit the first vehicle and the door is open, so the second vehicle is controlled to stop while the pedestrian exits the first vehicle. However, if the pedestrian makes a gesture to wave the second vehicle by (e.g., a "vehicle-go" gesture), then the second vehicle may be controlled to pass the first vehicle and proceed along the second vehicle's original trajectory.

In some examples, the techniques described herein for predicting door states associated with vehicles in an environment may be used to predict a change in a bounding box (e.g., convex hull) associated with an object in the environment as described in U.S. patent application Ser. No. 17/138, 751, which is incorporated herein by reference in its entirety and for all purposes. That is, a detected door state associated with a vehicle may be used to predict a change in a bounding box associated with the vehicle and/or another object.

In at least one example, a detected door state may be used to predict a state of another vehicle in the environment. For example, if a door of the other vehicle is detected to be closing or to have closed recently, then it may be predicted that the other vehicle may move out of a parking spot in the near future. As another example, if the door of the other vehicle is detected to be open, it may be predicted that the other vehicle may not move while the door is open.

In some examples, the other vehicle may be detected and then a location of where the doors will be in relation to the other vehicle may be determined by the machine-learned model. For instance, a detector may detect the presence of the other vehicle and determine a bounding box associated with the other vehicle, and the machine-learned model may determine the location of the doors and/or the door states based at least in part on the bounding boxes. By way of example, the sensor data may be cropped based on a bounding box of the other vehicle, and the cropped sensor data may be input into the machine-learned model. In additional, or alternative examples, the doors may be detected directly by the machine-learned model in a bottom-up technique (e.g., detecting a state of a door before detecting the other vehicle and/or the bounding box). In at least one example, a type of the other vehicle may be determined and/or classified to determine, among other things, how many doors the other vehicle has, the position of the doors in relation to the other vehicle, and the like. For instance, whether the vehicle is a sports car, a van, a truck, an SUV, a bus, and/or the like may be taken into consideration by the machine-learned model to determine the door states.

In at least one example, the machine-learned model may be trained to determine a door state associated with a vehicle. For instance, sensor data representing a vehicle may be received, and a door state (e.g., actual door state) associated with the vehicle may be determined. The sensor data may then be input into a machine-learned model and an output may be received from the machine-learned model that indicates a predicted door state associated with the vehicle. In some examples, a difference may be determined between the door state and the predicted door state, and a parameter of the machine-learned model may be adjusted to minimize the difference and obtain a trained machine-learned model that is capable of determining the actual door state associated with the vehicle.

In some examples, the sensor data (e.g., "training data") used to train the machine-learned model may comprise real sensor data captured by a vehicle operating in an environment. As such, the training sensor data may include one or multiple other vehicles. In some instances, the other vehicles may be positioned within the sensor data such that a first vehicle or a portion of the first vehicle partially occludes a second vehicle. For example, an open door of the first vehicle may partially occlude a second vehicle. In such an example, the training sensor data may be modified such that the sensor data does not include the occluded second vehicle, a detected bounding box associated with the second vehicle, data associated with the detected bounding box, and/or the like. In some examples, the sensor data corresponding to the second vehicle may be removed from the training sensor data altogether.

The techniques described herein can be implemented in a number of ways. Example implementations are provided below with reference to the following figures. Although discussed in the context of an autonomous vehicle, the techniques described herein can be applied to a variety of systems requiring control and/or interaction with pedestrians in an environment and is not limited to autonomous vehicles. In another example, the systems, methods, and apparatuses can be used in an aviation or in a nautical context, as well as a security context. Furthermore, although many of the examples described herein are with reference to image data, the techniques disclosed herein can be similarly performed based on inputs consisting of different data types (e.g., lidar data, radar data, sonar data, etc.).

FIG. 1 is a pictorial flow diagram illustrating an example data flow 100 that is associated with detecting a door state of a vehicle based on image data. The image data 102 may be captured by a sensor system of a vehicle 104, and the image data 102 may represent an environment 106 in which the vehicle 104 is operating. As shown, the environment 106 may include one or more object(s), such as the other vehicle 108. Additionally, or alternatively, the one or more object(s) in the environment 106 may include, for instance, trees, buildings, pedestrians, cyclists, animals, vehicles, streetlights, traffic signage, structures, and/or the like.

The vehicle 104 or a computing device of the vehicle 104 may receive the image data 102 and input the image data 102 into a detector 110. The detector 110 may detect the other vehicle 108 (as well as other objects) within the environment 106 represented by the image data 102. Additionally, the detector 110 may generate or determine one or more bounding boxes associated with detected objects, such as the bounding box 112 associated with the other vehicle 108. The detector 110 may then input the image data 102 into the tracker 114. In some examples, the inputted imaged data 102 may include the bounding box 112. In some instances, the detector 110 may crop or scale the image data 102 to a specific size before inputting it into the tracker 114, such that the image data 102 comprises a scaled image 116 representing the other vehicle 108. In other instances, the tracker 114 may scale or crop the image data 102 to the specific size of the scaled image(s) 116. For instance, the image data 102 may be scaled in proportion to the bounding box 112, such that only the image data associated with the other vehicle 108 is input into the tracker 114.

The tracker 114 may keep track of changes or movements associated with detected objects. For instance, the tracker 114 may track the differences between the different scaled images 116 with respect to various times along a timeline 118. For instance, between times $T_{0-N}$ to $T_0$ (where $T_0$ represents a present time), the tracker 114 may keep track of the movement of the door of the other vehicle 108. In some examples, time intervals between the times $T_0$, $T_{0-1}$, $T_{0-N}$, etc. may be equal. For instance, the time intervals between the times $T_0$, $T_{0-1}$, $T_{0-N}$, etc. may be 0.5 seconds, 1 second, 2 seconds, etc. Additionally, in some examples the time intervals may not be equal. For instance, a first time interval between times $T_0$ and $T_{0-1}$ may be 1 second and a second time interval between the times $T_{0-1}$ and $T_{0-N}$ may be 2 seconds.

Additionally, the multiple scaled image(s) 116 may be input into the machine-learned model 120. In some examples, the multiple scaled image(s) 116 may be input into the machine-learned model 120 at the time (e.g., $T_0$, $T_{0-1}$, $T_{0-N}$, etc.) at which they are captured. In other words, the multiple scaled image(s) 116 may not necessarily be input into the machine-learned model 120 all at once. However, in some instances the multiple scaled image(s) 116 may be input into the machine-learned model at the same time. In some examples, a full image frame of the image data 102 representing the environment 106 may be input into the machine-learned model 120.

The machine-learned model 120 may generate output data 122 based at least in part on the inputted scaled images 116 or the image data 102. The output data 122 may include an indication of door state 124 associated with the other vehicle 108. As shown in FIG. 1, the door state 124 indicates that the driver door of the other vehicle 108 is open. In some examples, the indication of the door state 124 and/or the bounding box 112 may be added to or otherwise included within the image data representing the environment 106. Additionally, the door state 124 indication and/or the updated image data 102 may be sent to a controller of the vehicle 104 to determine a driving instruction for the vehicle 104 based at least in part on the door state 124 associated with the other vehicle 108.

Figure 2:
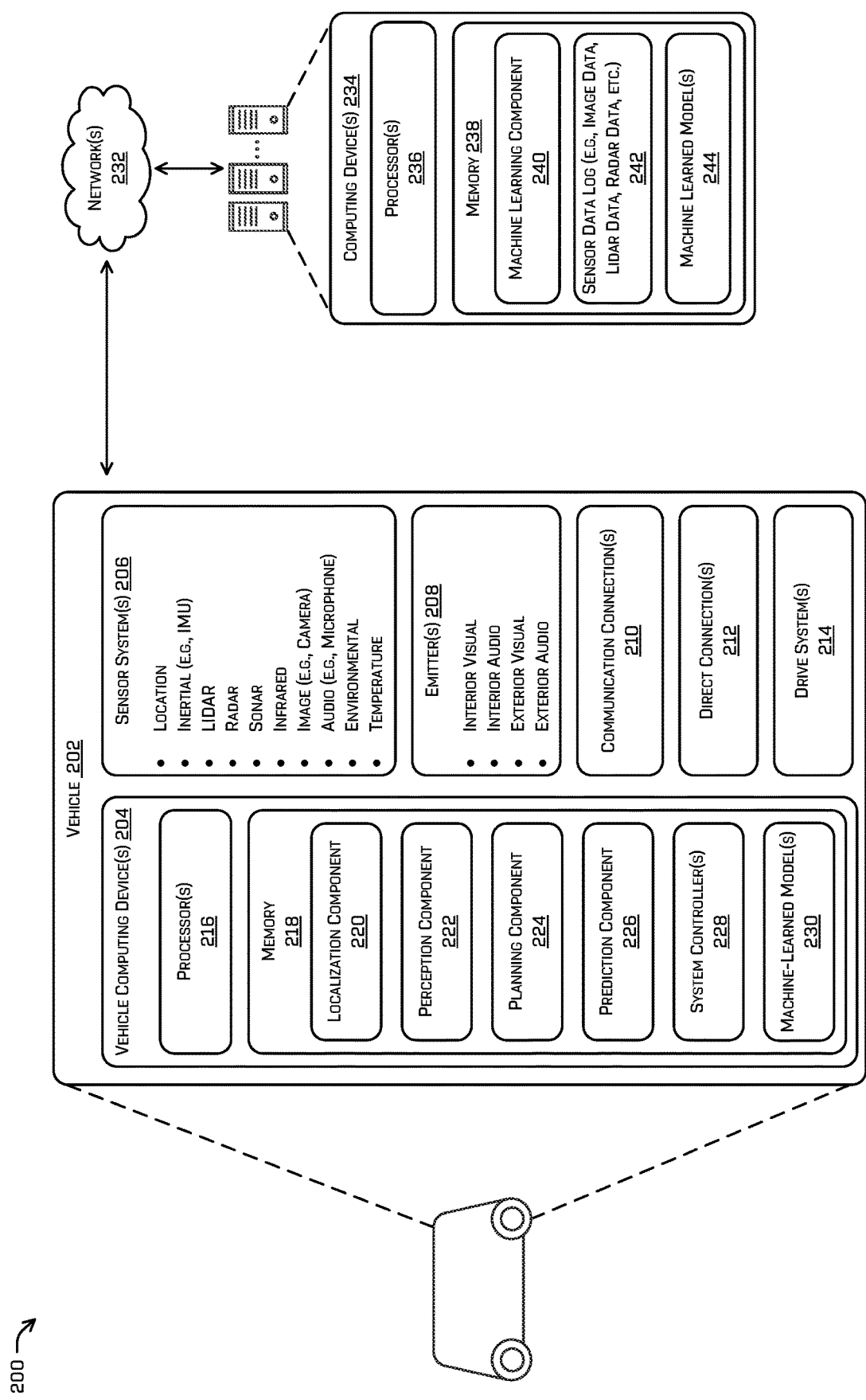
FIG. 2 is a block diagram illustrating an example system for implementing some of the various technologies described herein.

FIG. 2 is a block diagram illustrating an example system 200 for implementing some of the various technologies described herein. In at least one example, the example system 200 may include a vehicle 202, which can be similar to the vehicle 104 described above with reference to FIG. 1. In the illustrated example system 200, the vehicle 202 is an autonomous vehicle; however, the vehicle 202 may be any other type of vehicle.

The vehicle 202 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 202 may be configured to control all functions from start to completion of the trip, including all parking functions, it may not include a driver and/or controls for driving the vehicle 202, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 202 may be any configuration of vehicle, such as, for example, a van, a sport utility vehicle, a cross-over vehicle, a truck, a bus, an agricultural vehicle, and/or a construction vehicle. The vehicle 202 may be powered by one or more internal combustion engines, one or more electric motors, hydrogen power, any combination thereof, and/or any other suitable power sources. Although the vehicle 202 has four wheels, the systems and methods described herein may be incorporated into vehicles having fewer or a greater number of wheels, and/or tires. The vehicle 202 may have four-wheel steering and may operate generally with equal or similar performance characteristics in all directions, for example, such that a first end of the vehicle 202 is the front end of the vehicle 202 when traveling in a first direction, and such that the first end becomes the rear end of the vehicle 202 when traveling in the opposite direction. Similarly, a second end of the vehicle 202 is the front end of the vehicle when traveling in the second direction, and such that the second end becomes the rear end of the vehicle 202 when traveling in the opposite direction. These example characteristics may facilitate greater maneuverability, for example, in small spaces or crowded environments, such as parking lots and/or urban areas.

The vehicle 202 may include one or more computing device(s) 204, one or more sensor system(s) 206, one or more emitter(s) 208, one or more communication connection(s) 210 (also referred to as communication devices and/or modems), at least one direct connection 212 (e.g., for physically coupling with the vehicle 202 to exchange data and/or to provide power), and one or more drive system(s) 214. The one or more sensor system(s) 206 may be configured to capture sensor data (e.g., image data, lidar data, radar data, etc.) associated with an environment in which the vehicle 202 is operating.

The sensor system(s) 206 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 206 may include multiple instances of each of these or other types of sensors. For instance, the time-of-flight sensors may include individual time-of-flight sensors located at the corners, front, back, sides, and/or top of the vehicle 202. As another example, the camera sensors may include multiple camera modules disposed at various locations about the exterior and/or interior of the vehicle 202. The sensor system(s) 206 may provide input to the computing device(s) 204.

The vehicle 202 may also include one or more emitter(s) 208 for emitting light and/or sound. The one or more emitter(s) 208 in this example include interior audio and visual emitters to communicate with passengers of the vehicle 202. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 208 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 202 may also include one or more communication connection(s) 210 that enable communication between the vehicle 202 and one or more other local or remote computing device(s) (e.g., a remote teleoperations computing device) or remote services. For instance, the communication connection(s) 210 may facilitate communication with other local computing device(s) on the vehicle 202 and/or the drive system(s) 214. Also, the communication connection(s) 210 may allow the vehicle 202 to communicate with other nearby computing device(s) (e.g., other nearby vehicles, traffic signals, etc.).

The communications connection(s) 210 may include physical and/or logical interfaces for connecting the computing device(s) 204 to another computing device or one or more external networks 232 (e.g., the Internet). For example, the communications connection(s) 210 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 202 may include one or more drive system(s) 214. In some examples, the vehicle 202 may have a single drive system 214. In at least one example, if the vehicle 202 has multiple drive systems 214, individual drive systems 214 may be positioned on opposite ends of the vehicle 202 (e.g., the front and the rear, etc.). In at least one example, the drive system(s) 214 may include one or more sensor system(s) 206 to detect conditions of the drive system(s) 214 and/or the surroundings of the vehicle 202. By way of example and not limitation, the sensor system(s) 206 may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 214. In some cases, the sensor system(s) 206 on the drive system(s) 214 may overlap or supplement corresponding systems of the vehicle 202 (e.g., sensor system(s) 206).

The drive system(s) 214 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 214 may include a drive system controller which may receive and preprocess data from the sensor system(s) 206 and to control operation of the various vehicle systems. In some examples, the drive system controller may include one or more processor(s) and memory communicatively coupled with the one or more processor(s). The memory may store one or more modules to perform various functionalities of the drive system(s) 214. Furthermore, the drive system(s) 214 also include one or more communication connection(s) that enable communication by the respective drive system with one or more other local or remote computing device(s).

The computing device(s) 204 may include one or more processor(s) 216 and memory 218 communicatively coupled with the one or more processor(s) 216. In the illustrated example, the memory 218 of the computing device(s) 204 stores a localization component 220, a perception component 222, a planning component 224, a prediction component 226, one or more system controller(s) 228, and one or more machine-learned models 230. Though depicted as residing in the memory 218 for illustrative purposes, it is contemplated that the localization component 220, the perception component 222, the planning component 224, the prediction component 226, the one or more system controller(s) 228, and the one or more machine-learned models 230 may additionally, or alternatively, be accessible to the computing device(s) 204 (e.g., stored in a different component of vehicle 202 and/or be accessible to the vehicle 202 (e.g., stored remotely).

In the memory 218 of the computing device(s) 204, the localization component 220 may include functionality to receive data from the sensor system(s) 206 to determine a position of the vehicle 202. For example, the localization component 220 may include and/or request/receive a three-dimensional map of an environment and may continuously determine a location of the autonomous vehicle within the map. In some instances, the localization component 220 may use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 220 may provide data to various components of the vehicle 202 to determine an initial position of an autonomous vehicle for generating a trajectory, as discussed herein.

The perception component 222 may include functionality to perform object detection, segmentation, and/or classification. In some examples, the perception component 222 may provide processed sensor data that indicates a presence of an entity that is proximate to the vehicle 202 and/or a classification of the entity as an entity type (e.g., car, pedestrian, cyclist, building, tree, road surface, curb, sidewalk, unknown, etc.). In additional and/or alternative examples, the perception component 222 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The perception component 222 may include functionality to store perception data generated by the perception component 222. In some instances, the perception component 222 may determine a track corresponding to an object that has been classified as an object type. For purposes of illustration only, the perception component 222, using sensor system(s) 206 may capture one or more images of an environment. The sensor system(s) 206 may capture images of an environment that includes an object, such as a building, vehicle, trees, streetlights, pedestrians, etc.

The stored perception data may, in some examples, include fused perception data captured by the vehicle. Fused perception data may include a fusion or other combination of sensor data from sensor system(s) 206, such as image sensors, lidar sensors, radar sensors, time-of-flight sensors, sonar sensors, global positioning system sensors, internal sensors, and/or any combination of these. The stored perception data may additionally or alternatively include classification data including semantic classifications of objects (e.g., pedestrians, vehicles, buildings, road surfaces, etc.) represented in the sensor data.

The planning component 224 may determine a path for the vehicle 202 to follow to traverse through an environment. For example, the planning component 224 may determine various routes and paths and various levels of detail. In some instances, the planning component 224 may determine a route to travel from a first location (e.g., a current location) to a second location (e.g., a target location). For the purpose of this discussion, a route may be a sequence of waypoints for traveling between two locations. As non-limiting examples, waypoints include streets, intersections, global positioning system (GPS) coordinates, etc. Further, the planning component 224 may generate an instruction for guiding the autonomous vehicle along at least a portion of the route from the first location to the second location. In at least one example, the planning component 224 may determine how to guide the autonomous vehicle from a first waypoint in the sequence of waypoints to a second waypoint in the sequence of waypoints. In some examples, the instruction may be a path, or a portion of a path. In some examples, multiple paths may be substantially simultaneously generated (i.e., within technical tolerances) in accordance with a receding horizon technique. A single path of the multiple paths in a receding data horizon having the highest confidence level may be selected to operate the vehicle.

In other examples, the planning component 224 may alternatively, or additionally, use data from the perception component 222 to determine a path for the vehicle 202 to follow to traverse through an environment. For example, the planning component 224 may receive data from the perception component 222 regarding objects associated with an environment. Using this data, the planning component 224 may determine a route to travel from a first location (e.g., a current location) to a second location (e.g., a target location) to avoid objects in an environment. In at least some examples, such a planning component 224 may determine there is no such collision free path and, in turn, provide a path which brings vehicle 202 to a safe stop avoiding all collisions and/or otherwise mitigating damage. In at least one example, the planning component 224 may receive indications of door states of vehicles in the environment of the vehicle 202, as well as, or in addition to, gestures of pedestrians in the environment of the vehicle 202, and determine, among other things, a route for the vehicle 202 to travel, to stop or decelerate the vehicle 202, to accelerate the vehicle 202, to maintain a trajectory of the vehicle 202, etc.

The memory 218 of the computing device(s) 204 may additionally store a prediction component 226 that is configured to estimate current, and/or predict future, characteristics or states of an object (e.g., a pedestrian, animal, other vehicle, etc.), such as pose, speed, trajectory, velocity, yaw, yaw rate, roll, roll rate, pitch, pitch rate, position, acceleration, or other characteristics, based on one or more images of the object. For instance, the prediction component 226 may receive image data from sensor data captured by a camera or other image sensor of sensor system(s) 206 and predict one or more of the foregoing characteristics of the object. The prediction can be made based on a single image or multiple images (e.g., multiple sequential image frames) depicting the object. In at least one example, the prediction component 226 may use the one or more machine-learned models 230 to determine a state of a door of another vehicle in the environment of the vehicle 202. In some examples, the prediction component 226 can determine, based on a door state of a vehicle, a destination for a pedestrian in an environment and can determine a predicted trajectory of the pedestrian (e.g., to cross a street, either by crosswalk or by jaywalking, to enter the vehicle). Examples of determining a predicted trajectory of a pedestrian based on a destination in an environment are discussed in U.S. patent application Ser. No. 16/363,541, which is incorporated herein by reference in its entirety and for all purposes.

In at least one example, the computing device(s) 204 may include one or more system controller(s) 228, which may be configured to control steering, propulsion, braking, safety, emitters, communication, and other systems of the vehicle 202. These system controller(s) 228 may communicate with and/or control corresponding systems of the drive system(s) 214 and/or other components of the vehicle 202, which may be configured to operate in accordance with a path provided from the planning component 224.

The memory 218 of the vehicle computing devices 204 may additionally include the one or more machine-learned models 230. In some examples, the machine-learned models 230 may include a machine-learned model that is trained to detect door states associated with other vehicles as described herein. In various examples, the machine-learned model(s) 230 may be implemented as neural network(s), convolution neural network(s), or recurrent neural network(s).

As described herein, an exemplary neural network is an algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network Stacked (CNN), Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

The vehicle 202 may connect to one or more computing device(s) 234 via one or more network(s) 232. The computing device(s) 234 include one or more processor(s) 236 and memory 238 communicatively coupled with the one or more processor(s) 236. In at least one instance, the one or more processor(s) 236 may be similar to the processor(s) 216 and the memory 238 may be similar to the memory 218. In the illustrated example, the memory 238 of the computing device(s) 234 stores a machine learning component 240, a sensor data log 242, and one or more machine-learned model(s) 244. Though depicted as residing in the memory 238 for illustrative purposes, it is contemplated that the machine learning component 240, the sensor data log 242, and the machine-learned model(s) 244 may additionally, or alternatively, be accessible to the computing device(s) 234 (e.g., stored in a different component of computing device(s) 234 and/or be accessible to the computing device(s) 234 (e.g., stored remotely).

In the memory 238 of the computing device(s) 234, the machine learning component 240 may be used to train the one or more machine-learned model(s) 230 and/or 244. For instance, the machine-learning component 240 may access training data stored in the sensor data log 242 in order to train the one or more machine-learned model(s) 230 and/or 244. The sensor data log 242 may include various data logs based on different sensor data types, such as image data, lidar data, radar data, and the like. Additionally, the sensor data log 242 may include sensor data associated with various door states (e.g., open, closed, opening, closing, partially open, partially closed, etc.) of various different types of vehicles (e.g., cars, trucks, vans, SUVs, etc.). The machine learning component 240 may include functionality to receive real data, modified data, and/or simulated data to train one or more untrained neural networks to generate a plurality of trained neural networks. During training, the machine learning model component 240 may adjust weights, filters, connections between layers, and/or parameters for training the individual untrained neural networks to perform door state detection (or other tasks), as discussed herein. In some instances, the machine learning component 240 may use supervised or unsupervised training.

Additionally, the memory 238 stores the machine-learned model(s) 244. In at least one example, the machine-learned models 244 may be similar to the machine-learned models 230 stored by the memory 218 of the vehicle computing devices 204. For instance, the machine-learned models 244 may include the machine-learned model that is trained to detect door states associated with other vehicles. In various examples, the machine-learned model(s) 244 may be implemented as neural network(s), convolution neural network(s), or recurrent neural network(s).

The processor(s) 216 of the computing device(s) 204 and the processor(s) 236 of the computing device(s) 234 may be any suitable processor capable of executing instructions to process data and perform operations as described herein. By way of example and not limitation, the processor(s) 216 and 236 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 218 of the computing device(s) 204 and the memory 238 of the computing device(s) 234 are examples of non-transitory computer-readable media. The memory 218 and 238 may store an operating system and one or more software applications, instructions, programs, and/or data to implement the methods described herein and the functions attributed to the various systems. In various implementations, the memory 218 and 238 may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, aspects of some or all of the components discussed herein may include any models, algorithms, and/or machine learning algorithms. For example, in some instances, the components in the memory 218 and 238 may be implemented as one or more neural network(s).

Figure 3:
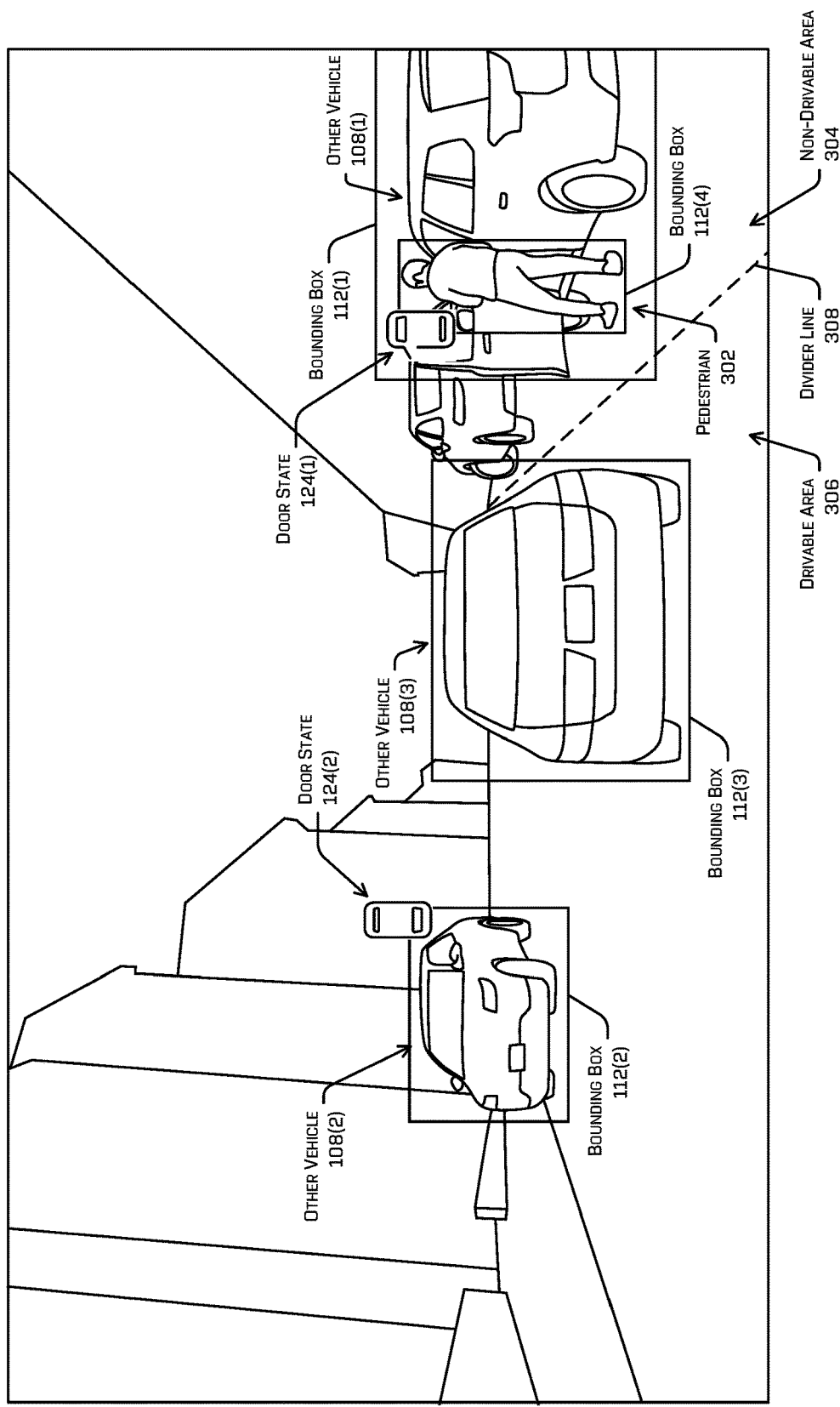
FIG. 3 is a perspective view of an example environment in which door states of other vehicles have been determined.

FIG. 3 is a perspective view of an example environment 300 in which door states of other vehicles have been determined. The perspective view of the example environment 300 may be perceived, for example, from the perspective of the vehicle(s) 104 and/or 202 described above in FIGS. 1 and 2. That is, the vehicle(s) 104 and/or 202 may be traversing the example environment 300 and capture sensor data representing the example environment 300, as shown.

Objects in the example environment 300 may be detected and classified. For instance, a detector 110 may detect the objects in the environment 300 and classify the objects as other vehicles 108(1)-108(3), pedestrians, such as the pedestrian 302, buildings, trees, and/or the like. Additionally, bounding boxes may be determined for the detected objects, such as the bounding boxes 112(1)-112(4) associated with the other vehicles 108(1)-108(3) and the pedestrian 302.

Additionally, door states 124(1) and 124(2) may be determined for the other vehicles 108(1) and 108(2), respectively. In some examples, the door states 124(1) and 124(2) are determined for the other vehicles 108(1) and 108(2) based at least in part on determining that the other vehicles 108(1) and 108(2) are parked and/or not moving. Additionally, a door state of the other vehicle 108(3) may not be determined based at least in part on determining that the other vehicle 108(3) is moving. However, in other examples door states may be determined for all of the other vehicles 108(1)-108(3), regardless of whether the other vehicles 108(1)-108(3) are parked, moving, not moving, etc.

In various examples, sensor data representing the environment 300 and/or portions of the environment 300 (e.g., a first portion of the environment corresponding to the other vehicle 108(1), a second portion of the environment corresponding to the other vehicle 108(2), etc.) may be input into a machine-learned model, such as the machine-learned model 120 or the machine-learned model(s) 230 or 244. Based at least in part on the input sensor data representing the environment 300 and/or the portions of the environment 300, the machine-learned model may determine and/or generate output data indicating the door states 124(1) and 124(2) associated with the other vehicles 108(1) and 108(2), respectively.

The door state 124(1) associated with the other vehicle 108(1) shown in FIG. 3 indicates that the front-left (driver) door of the other vehicle 108(1) is in an open state. Additionally, the door state 124(1) indicates that all other doors of the other vehicle 108(1) are in a closed state. In comparison, the door state 124(2) associated with the other vehicle 108(2) shown in FIG. 3 indicates that all of the doors of the other vehicle 108(2) are in a closed state.

In some examples, a non-drivable area 304 and/or a drivable area 306 (separated by the divider line 308) may be determined. The non-drivable area 304 may indicate an area where the vehicle should not enter due to the presence of pedestrians, vehicles, or other objects, and the drivable area 306 may indicate an area where the vehicle is allowed to operate under normal conditions. The non-drivable area 304 may, in some examples, increase or decrease in area based on door states of other vehicles. For instance, the non-drivable area 304 shown in FIG. 3 may decrease in size if the door state 124(1) associated with the other vehicle 108(1) changes from the open state to a closed state, closing state, partially closed state, and/or the like. In the same way, a size of the drivable are 306 may increase or decrease based on the doors states of other vehicles. In at least one example, the non-drivable are 304 and/or the drivable area 306 may be of a size that is dependent on a size of a door (e.g., how far a door protrudes from a vehicle), a type of a door (e.g., sliding door, hinged door, butterfly door, etc.).

Figure 4A:
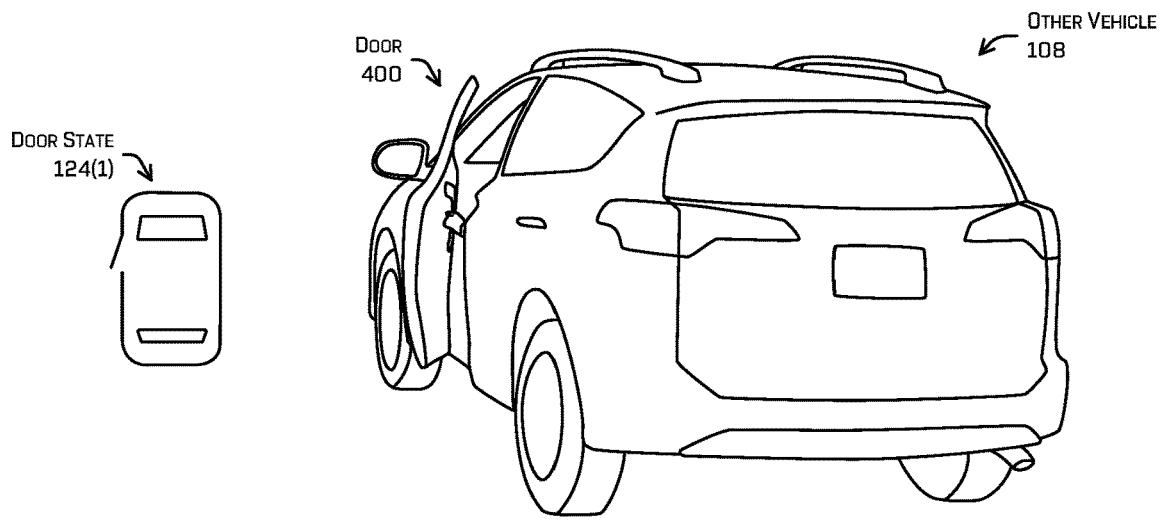
FIGS. 4A-4C collectively illustrate an example in which a door state associated with another vehicle is updated as a position of the door changes.
Figure 4B:
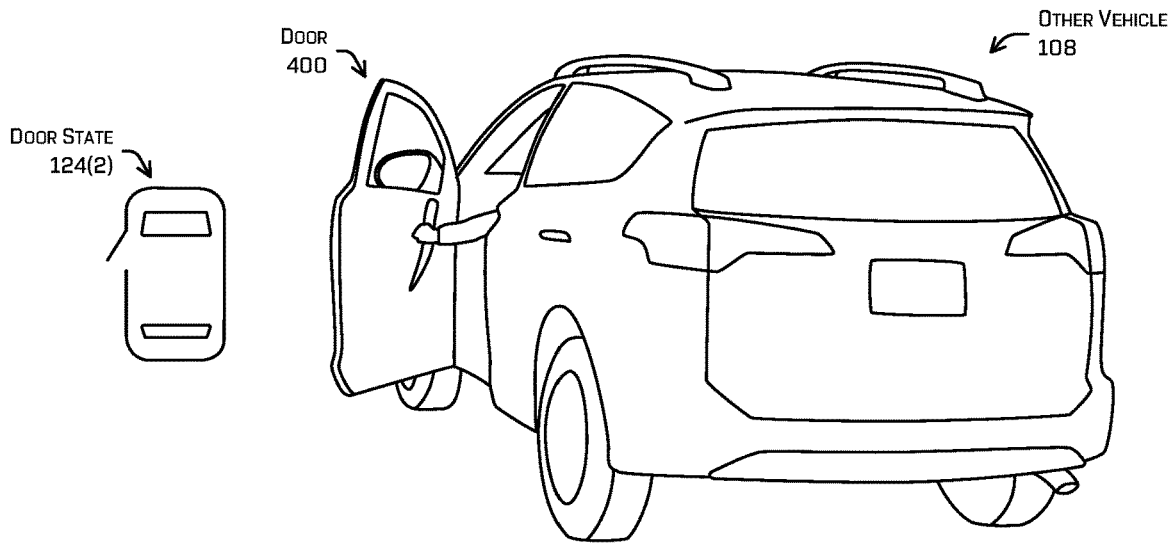
Figure 4C:
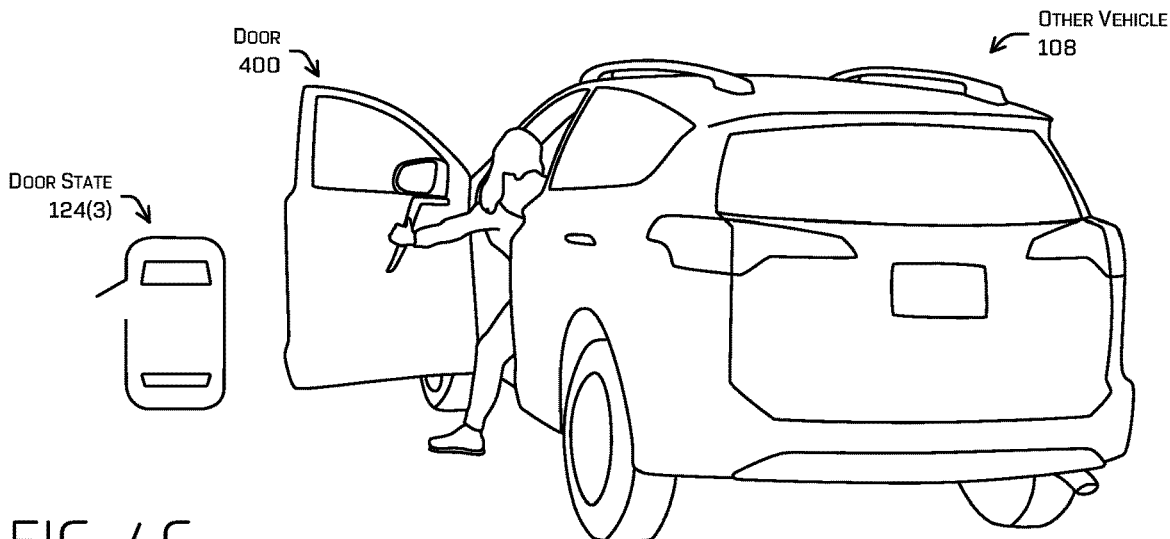

FIGS. 4A-4C collectively illustrate an example in which door states 124(1)-124(3) associated with another vehicle 108 are updated as a position of the door 400 changes. In FIGS. 4A-4C, the door states 124(1)-124(3) may indicate that the door of the other vehicle 108 is opening.

FIG. 4A depicts the position of the door 400 of the other vehicle 108 at a first time. At the first time, the occupant of the other vehicle 108 is beginning to open the door 400. Sensor data representing the other vehicle 108 and the position of the door 400 at the first time may be captured and input into a machine-learned model that determines the door state 124(1) based at least in part on the sensor data. The door state 124(1) indicates that the door 400 of the other vehicle 108 is partially opened.

FIG. 4B depicts the position of the door 400 of the other vehicle 108 at a second time after the first time. At the second time, the door 400 of the other vehicle 108 is approximately halfway open. In some examples, sensor data representing the other vehicle 108 and the position of the door 400 at the second time may be captured and input into the machine-learned model that determines the door state 124(2) based at least in part on the sensor data. That is, as time progresses from the first time to the second time, the door state associated with the other vehicle 108 may be updated to correspond with the position(s) of the door 400.

FIG. 4C depicts the position of the door 400 of the other vehicle 108 at a third time after the second time. At the third time, the door 400 of the other vehicle 108 is approximately fully opened and the occupant is about to exit the other vehicle 108. As above, sensor data representing the other vehicle 108 and the position of the door 400 at the third time may be captured and input into the machine-learned model that determines the door state 124(3) based at least in part on the sensor data. In this way, as time progresses from the first time to the second time, and then from the second time to the third time, the door state(s) associated with the other vehicle 108 is updated to correspond with the position(s) of the door 400 at the different times.

In examples, the different door states 124(1)-124(3) may be used by a controller of a vehicle to alter a trajectory of the vehicle. For instance, the trajectory of the vehicle may be altered to increase a distance between the vehicle and the other vehicle 108 based at least in part on the door opening and/or the occupant exiting the other vehicle 108. Additionally, or alternatively, the trajectory of the vehicle may be altered to decelerate or stop the vehicle based at least in part on the door states 124(1)-124(3). In even further examples, a bounding box associated with the other vehicle 108 may be adjusted (e.g., increased in size or area) based at least in part on the door states 124(1)-124(3). As another example, an object cost or risk associated with the other vehicle 108 may be determined based at least in part on the door states 124(3), and the object cost or risk may be used to determine whether to alter a trajectory of the vehicle.

Figure 5A:
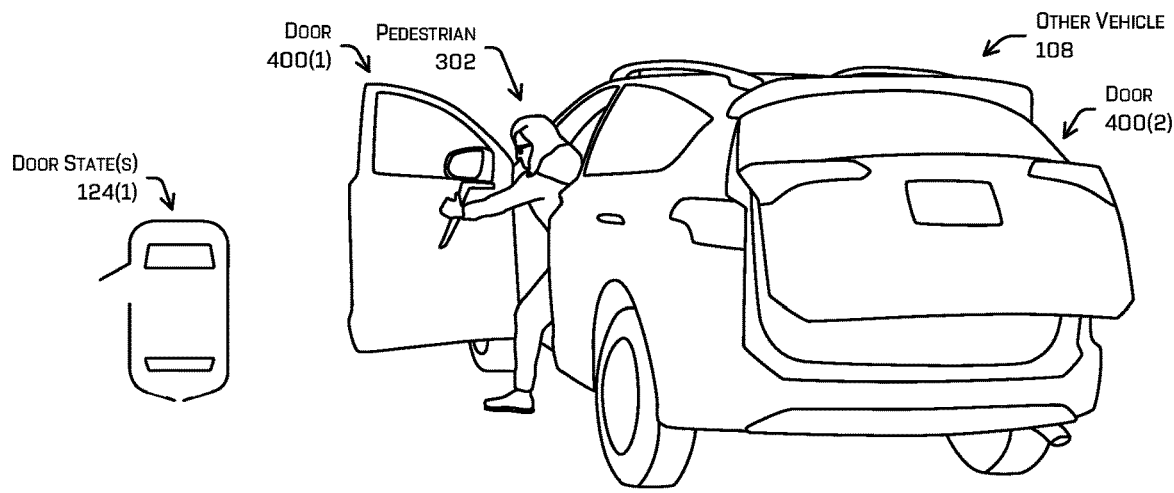
FIGS. 5A-5C collectively illustrate an example in which a predicted location of a pedestrian is determined based at least in part on door states associated with a vehicle.
Figure 5B:
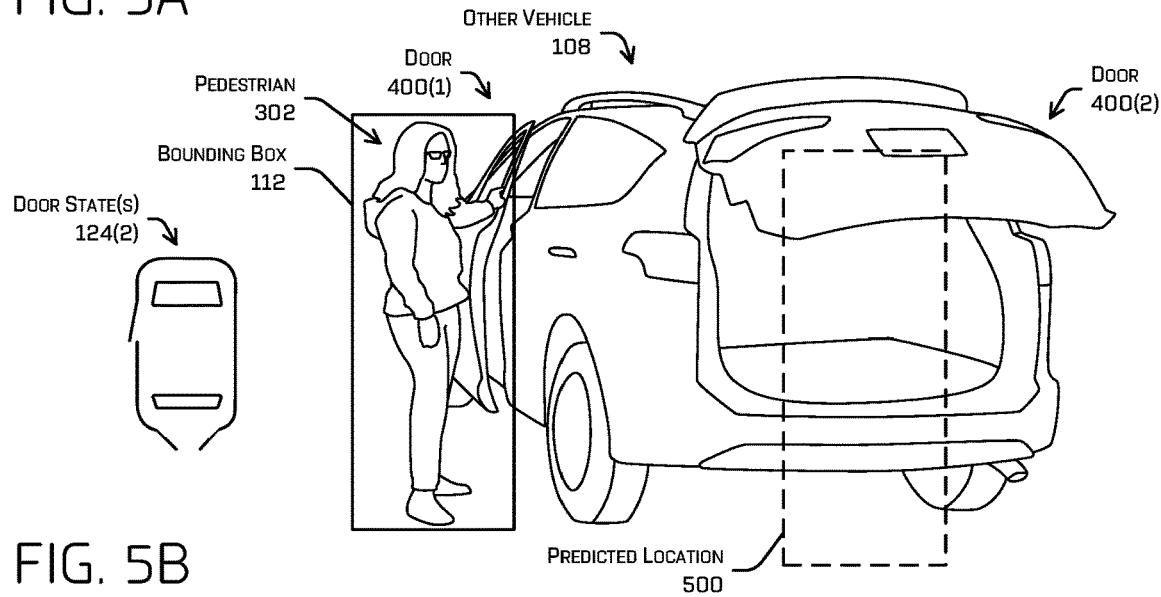
Figure 5C:
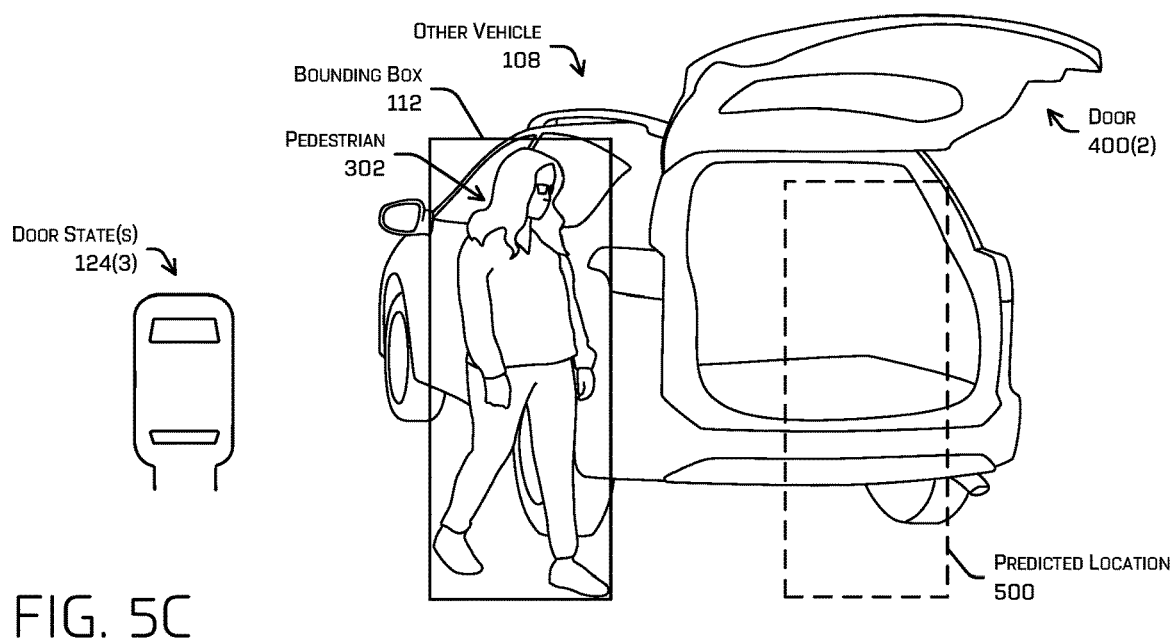

FIGS. 5A-5C collectively illustrate an example in which a predicted location 500 of a pedestrian 302 is determined based at least in part on door states 124(1)-124(3) associated with another vehicle 108. For instance, based on detecting that the pedestrian 302 exited the driver door 400(1) of the other vehicle 108 and based on detecting that the rear door 400(2) of the other vehicle 108 is opening, the predicted location 500 of the pedestrian 302 at a future time may be determined to be proximate the rear door 400(2). Additionally, in some examples, based on detecting that the door 400(1) is in an open state, a confidence score associated with the detected pedestrian 302 may be increased (e.g., because the door 400(1) is open, the probability that a pedestrian is nearby is greater than if the door 400(1) were closed).

FIG. 5A depicts the position of the driver door 400(1) and the rear door 400(2) of the other vehicle 108 at a first time. At the first time, the driver door 400(1) of the other vehicle 108 is approximately fully opened and the pedestrian 302 is exiting the other vehicle 108. Additionally, the rear door 400(2) of the other vehicle 108 is beginning to open at the first time. Sensor data representing the other vehicle 108 and the positions of the doors 400(1) and 400(2) at the first time may be captured and input into a machine-learned model that determines the door states 124(1) based at least in part on the sensor data. The door sates 124(1) indicate that the driver door 400(1) of the other vehicle 108 is in an approximately fully opened state and that the rear door 400(2) of the other vehicle 108 is in a partially opened state.

FIG. 5B depicts the position of the driver door 400(1) and the rear door 400(2) of the other vehicle 108 at a second time that is after the first time, as well as the pedestrian 302 at the second time. A bounding box 112 associated with the pedestrian 302 is also shown, and the bounding box 112 may indicate a current location of the pedestrian 302 at the second time. At the second time, the driver door 400(1) of the other vehicle 108 is being closed by the pedestrian 302 such that the driver door 400(1) is in a partially opened state. Additionally, the rear door 400(2) of the other vehicle 108 is approximately halfway open at the second time. As above, sensor data representing the other vehicle 108 and the positions of the doors 400(1) and 400(2) at the second time may be captured and input into the machine-learned model that determines the door states 124(2) based at least in part on the sensor data. The door sates 124(2) indicate that the driver door 400(1) of the other vehicle 108 is in a partially opened/almost-closed state and that the rear door 400(2) of the other vehicle 108 is approximately halfway opened. Based at least in part on the door states 124(2) the predicted location 500 associated with the pedestrian 302 may be determined. In other words, based at least in part on the positions of the driver door 400(1) and the rear door 400(2) at the second time, as well as the current location of the pedestrian 302 at the second time, a component of the vehicle (e.g., prediction component 226) may determine the predicted location 500.

FIG. 5C depicts the position of the driver door 400(1) and the rear door 400(2) of the other vehicle 108 at a third time that is after the second time, as well as the pedestrian 302 at the second time. The bounding box 112 may indicate the current location of the pedestrian 302 at the third time as the pedestrian 302 moves towards the predicted location 500. At the third time, the driver door 400(1) of the other vehicle 108 is closed. Additionally, the rear door 400(2) of the other vehicle 108 is approximately fully opened at the third time. As above, sensor data representing the other vehicle 108 and the positions of the doors 400(1) and 400(2) at the third time may be captured and input into the machine-learned model that determines the door states 124(3) based at least in part on the sensor data. The door sates 124(3) indicate that the driver door 400(1) of the other vehicle 108 is in a closed state and that the rear door 400(2) of the other vehicle 108 is approximately fully opened. Based at least in part on the door states 124(3) the predicted location 500 associated with the pedestrian 302 may be determined and/or updated. In other words, based at least in part on the positions of the driver door 400(1) and the rear door 400(2) at the third time, as well as the current location of the pedestrian 302 at the third time, a component of the vehicle (e.g., prediction component 226) may determine and/or updated the predicted location 500.

In various examples, the different door states 124(1)-124(3) may be used by a controller of a vehicle 104 to alter a trajectory of the vehicle 104. For instance, the trajectory of the vehicle 104 may be altered to increase a distance between the vehicle and the other vehicle 108 based at least in part on the door states 124(1)-124(3), the current location of the pedestrian 302, and/or the predicted location 500 of the pedestrian 302. Additionally, or alternatively, the trajectory of the vehicle may be altered to decelerate or stop the vehicle, an object cost or risk associated with the other vehicle 108 may be determined, and the like.

Figure 6A:
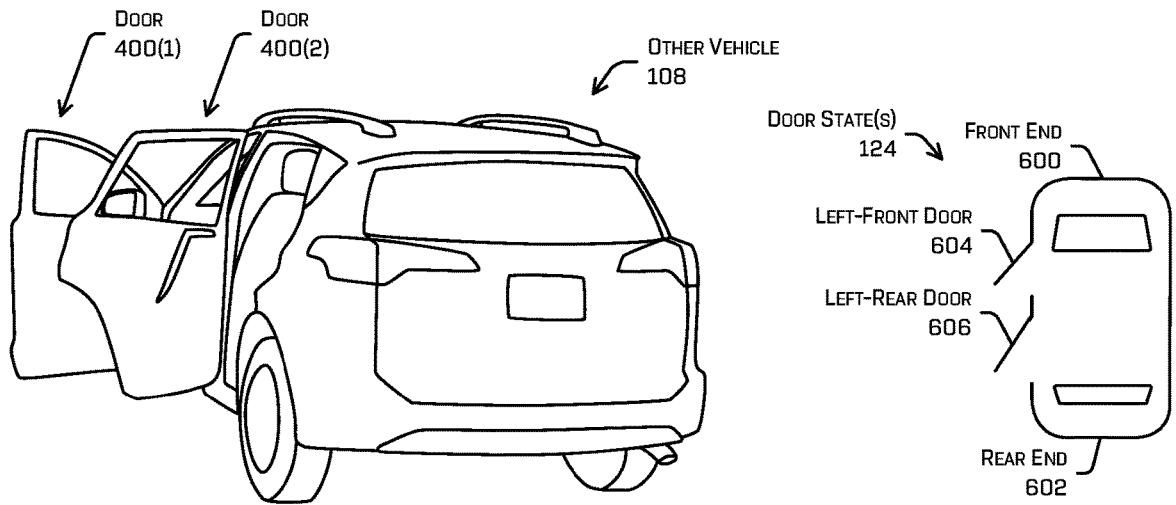
FIGS. 6A and 6B illustrate some example door states that may be determined for other vehicles.
Figure 6B:
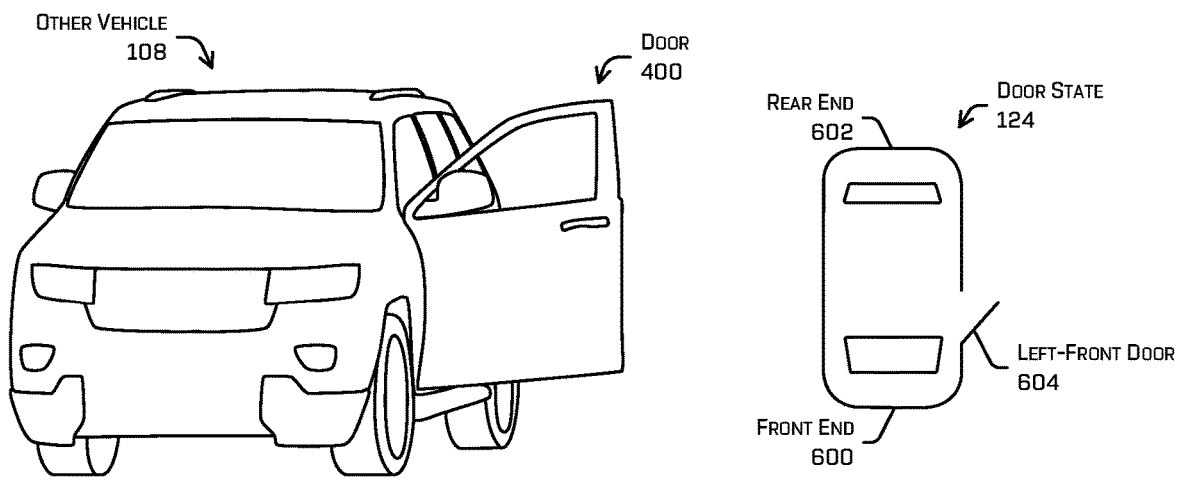

FIGS. 6A and 6B illustrate some example door states that may be determined for other vehicles. In FIG. 6A, the other vehicle 108 is depicted with both of the left-front (driver) door 400(1) and the left-rear (passenger) door 400(2) in open states. The example door states 124 indicate that the left-front door 400(1) and the left-rear door 400(2) of the other vehicle 108 are open. Additionally, the example door states 124 may indicate a direction that the other vehicle 108 is facing. For instance, the door state(s) indicator 124 may include a front end 600 that corresponds with the front end of the other vehicle 108, a rear end 602 that corresponds with the rear end of the other vehicle 108, as well as a left-front door 604 and a left-rear door 606 that corresponds with the left-front door 400(1) and left-rear door 400(2) of the other vehicle 108, respectively.

In FIG. 6B, the other vehicle 108 is depicted with the left-front (driver) door 400 in an open position. Sensor data representing the other vehicle 108 may be input into a machine-learned model and the machine-learned model may generate output data indicating the door state 124. The indication of the door state 124 may indicate that the front-left door 400 of the other vehicle 108 is in an open state, as well as a direction that the other vehicle 108 is facing. For instance, the door state indicator 124 includes a front end 600 that corresponds with the front end of the other vehicle 108, a rear end 602 that corresponds with the rear end of the other vehicle 108, as well as a left-front door 604 that corresponds with the left-front door 400 of the other vehicle 108.

Figure 7A:
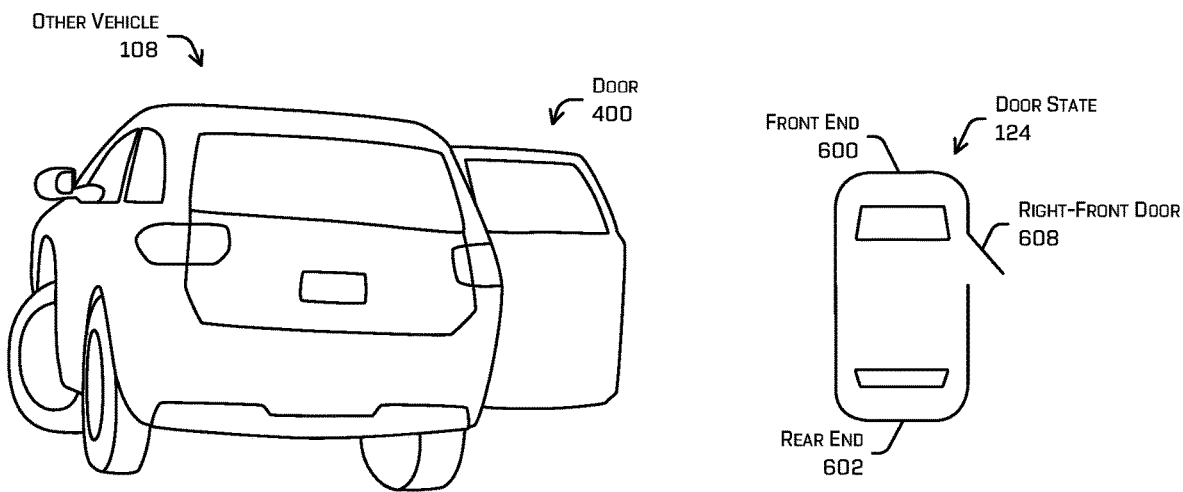
FIGS. 7A and 7B illustrate some additional example door states that may be determined for other vehicles.
Figure 7B:
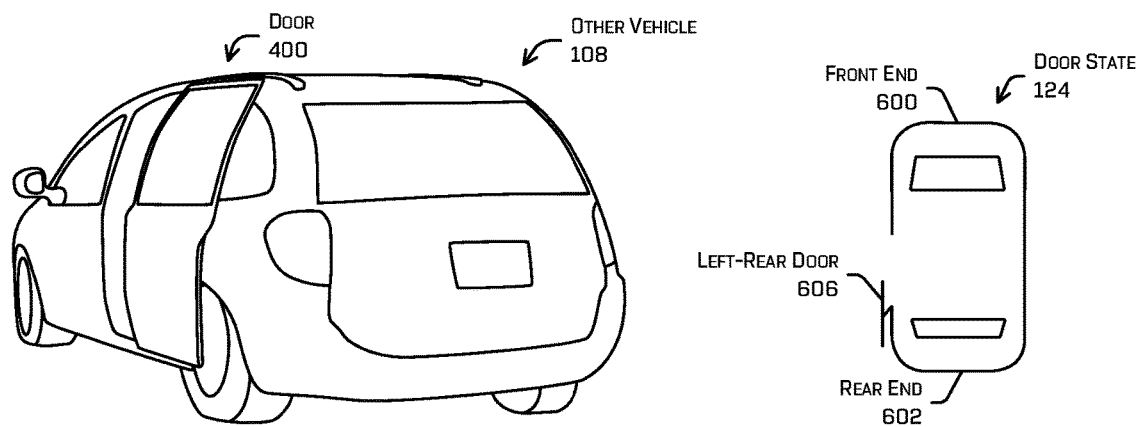

FIGS. 7A and 7B illustrate some additional example door states that may be determined for other vehicles. In FIG. 7A, the other vehicle 108 is depicted with the right-front door (e.g., curb-side door) 400 in an open position. The example door state 124 indicates that the right-front door 400 of the other vehicle 108 is open. Additionally, the example door state 124 indicates the direction that the other vehicle 108 is facing. For instance, the door state indicator 124 includes a front end 600 that corresponds with the front end of the other vehicle 108, a rear end 602 that corresponds with the rear end of the other vehicle 108, as well as a right-front door 608 that corresponds with the right-front door 400 of the other vehicle 108.

In FIG. 7B, the other vehicle 108 is depicted as a van and the sliding, left-rear door 400 is in an open position. The indication of the door state 124 may indicate that the left-rear door 400 of the other vehicle 108 is in an open state, and that the left-rear door 400 is a sliding-type van door. Additionally, the door state indicator 124 may indicate a direction that the other vehicle 108 is facing. For instance, the door state indicator 124 includes a front end 600 that corresponds with the front end of the other vehicle 108, a rear end 602 that corresponds with the rear end of the other vehicle 108, as well as a left-rear door 606 that corresponds with the left-rear door 400 of the other vehicle 108.

Figure 8:
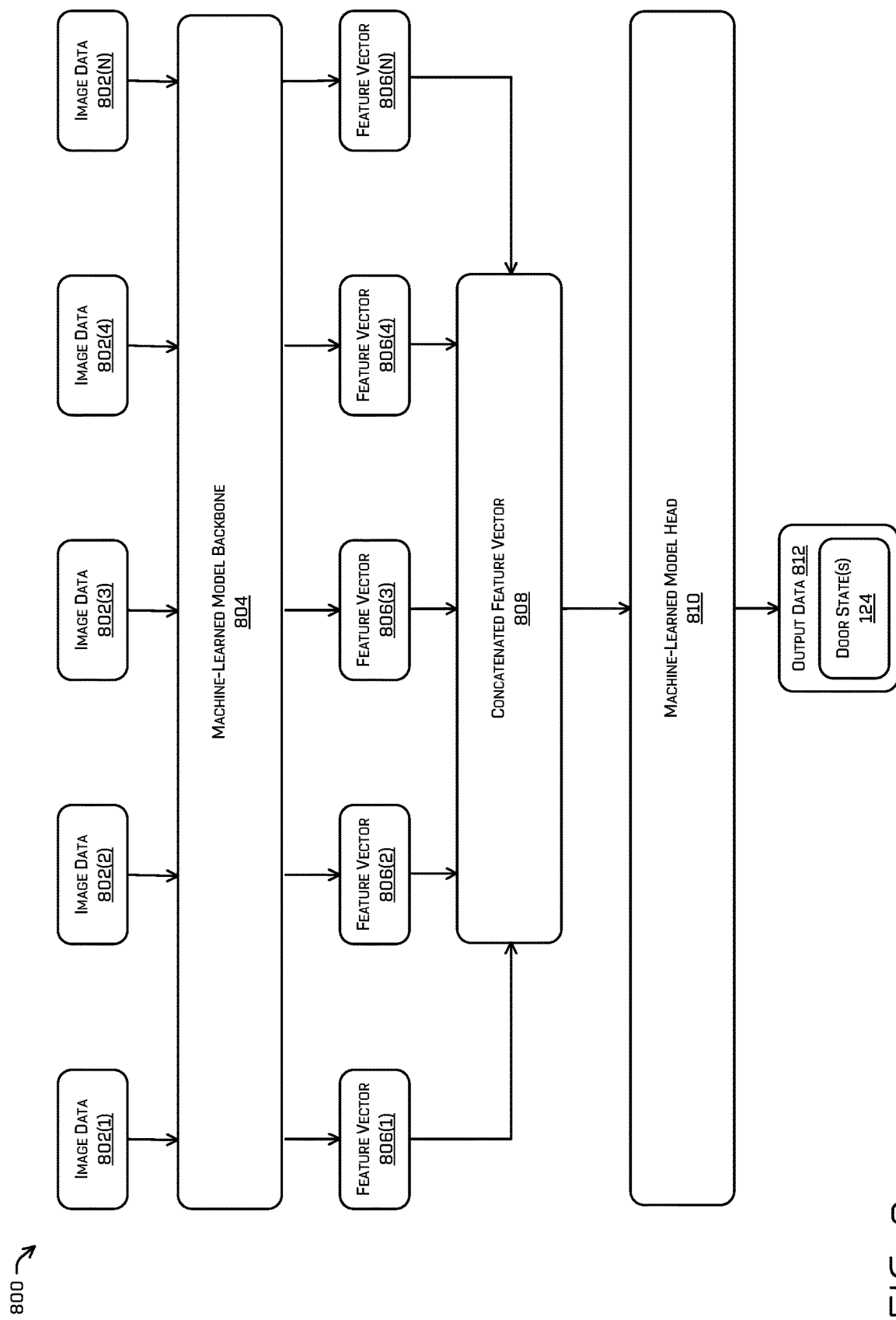
FIG. 8 is a flow diagram illustrating an example structure and data flow associated with a machine-learned model that may be used to determine door states.

FIG. 8 is a flow diagram illustrating an example structure 800 and data flow associated with a machine-learned model that may be used to determine door states. The machine-learned model(s) 120, 230, and 244 described above may include a similar structure to the example structure 800.

As shown, image data 802(1)-802(N) (where N represents any number greater than or equal to one) may be input into the machine-learned model backbone 804. In some instances, the machine-learned model backbone 804 may comprises a convolutional neural network backbone. The machine-learned model backbone 804 may perform one or more convolutions (e.g., 1-D convolutions, 2-D convolutions, 3-D convolutions, etc.) and/or mathematical algorithms on each of the image data files 802(1)-802(N) to generate the feature vectors 806(1)-806(N). The feature vector 806(1) may correspond to the image data 802(1), the feature vector 806(2) may correspond to the image data 802(2), the feature vector 806(3) may correspond to the image data 802(3), and so forth. Although the machine-learned model backbone 804 is shown in FIG. 8 as determining separate feature vectors 806(1)-806(N) for each of the different image data inputs 802(1)-802(N), it is contemplated that the machine-learned model backbone 804 may determine aggregated features from all of the image data inputs 802(1)-802(N).

The machine-learned model may additionally concatenate the individual feature vectors 806(1)-806(N) such that a concatenated feature vector 808 is generated. In some examples, the machine-learned model backbone 804 may concatenate the feature vectors 806(1)-806(N). Alternatively, in other examples, a machine-learned model head 810 may concatenate the feature vectors 806(1)-806(N), or another component of the machine-learned model structure 800 may concatenate the feature vectors 806(1)-806(N). In some examples, if the machine-learned model backbone 804 is configured to output the aggregated features from all of the image data inputs 802(1)-802(N), then the aggregated features may be input directly into the machine-learned model head 810 without concatenation.

The concatenated feature vector 808 may be input into the machine-learned model head 810. In some examples, the machine-learned model head 810 may comprise a temporal head. The machine-learned model head 810 may perform one or more convolutions and/or mathematical algorithms on the concatenated feature vector 808 to determine and/or generate output data 812, which may include one or more door states 124 associated with vehicles in an environment. For instance, based on receiving the concatenated feature vector 808 as an input, the machine-learned model head 810 may determine that a driver-side door of a vehicle is open.

Figure 9:
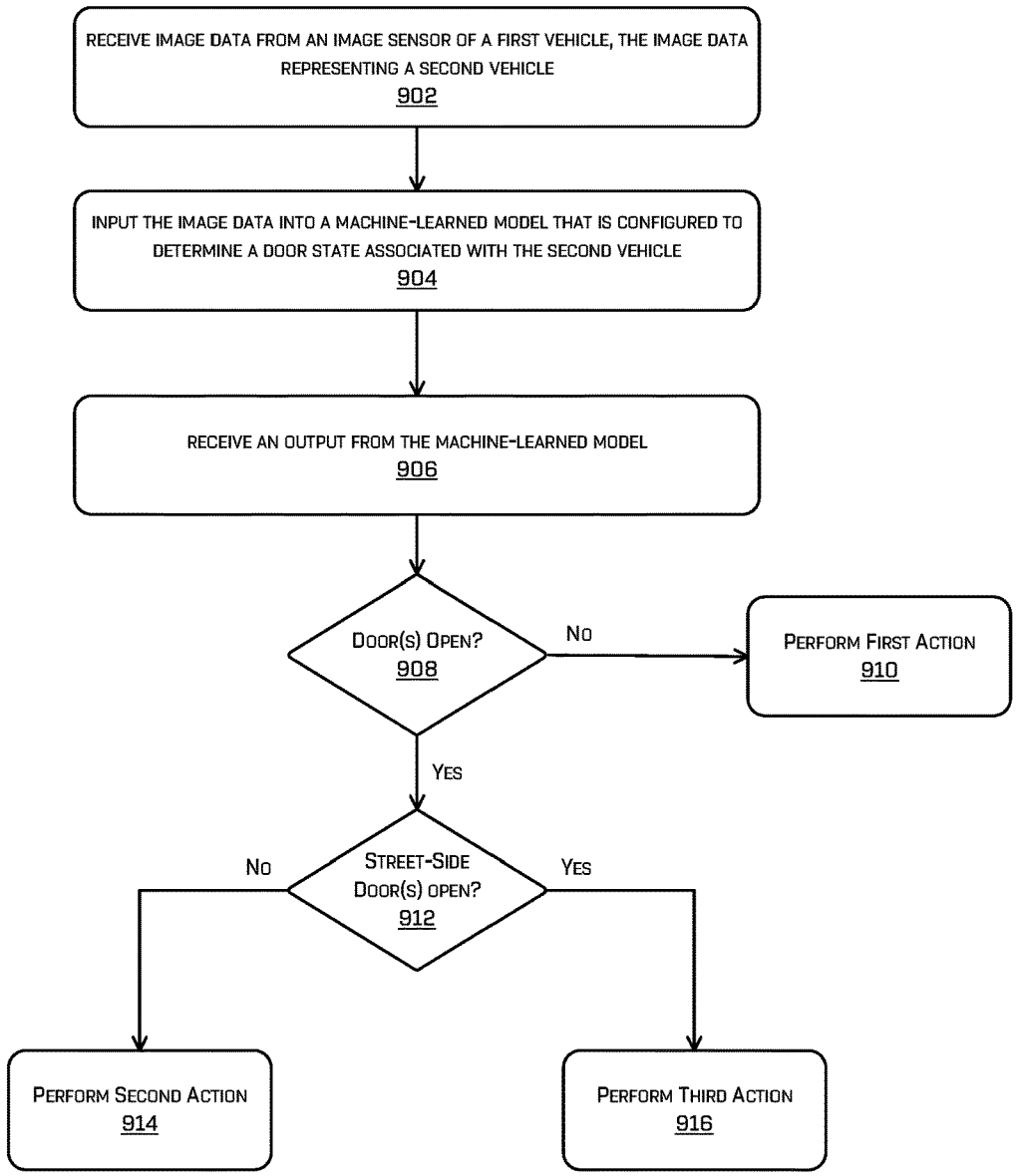
FIG. 9 is a flowchart illustrating an example method that may be performed at least in part by a vehicle computing device to control a vehicle based at least in part on a door state associated with another vehicle.

FIG. 9 is a flowchart illustrating an example method that may be performed at least in part by a vehicle computing device to control a vehicle based at least in part on a door state associated with another vehicle. The method 900 illustrated in FIG. 9 is described with reference to one or more of the vehicles and/or systems described in FIGS. 1-8 for convenience and ease of understanding. However, the method 900 illustrated in FIG. 9 is not limited to being performed using the vehicles, systems, and/or techniques described in FIGS. 1-8, and may be implemented using any of the other vehicles, systems, and technologies described in this application, as well as vehicles, systems, and technologies other than those described herein. Moreover, the vehicles, systems, and user interfaces described herein are not limited to performing the method 900 illustrated in FIG. 9.

The method 900 is illustrated as a collection of blocks in a logical flow graph, which represents sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some examples, one or more blocks of the process may be omitted entirely. Moreover, the method 900 may be combined in whole or in part with other methods described herein.

The method 900 begins at operation 902, which includes receiving image data from an image sensor of a first vehicle, the image data representing a second vehicle. For instance, the image data 102 may be received, and the image data 102 may have been captured by an image sensor of the vehicle 104. Additionally, the image data 102 may represent the environment 106, which includes the other vehicle. Alternatively, the received image data may comprise a scaled image 116 associated with the other vehicle 108.

At operation 904, the method 900 includes inputting the image data into a machine-learned model that is configured to determine a door state associated with the second vehicle. For instance, the image data 102 or the scaled images 116 may be input into the machine-learned model 120 that is configured to generate output data 122 that includes a door state 124 associated with the other vehicle 108.

At operation 906, the method 900 includes receiving an output from the machine-learned model. For instance, the output data 122 may be received from the machine-learned model 120. The output may include the indication of the door state 124 associated with the other vehicle 108.

At operation 908, the method 900 includes determining whether any of the doors of the second vehicle are open. For instance, determining whether a door of the second vehicle is open may be based at least in part on the output (e.g., the door state 124 of the output data 122). If none of the doors are open, the method 900 proceeds to operation 910, which includes performing a first action. For instance, the first action may include causing the first vehicle to maintain a current trajectory, associating an object cost with the second vehicle, and the like.

However, if a door of the second vehicle is open, then the method 900 proceeds to operation 912, which includes determining whether a street-side door of the second vehicle is open. In some examples, determining whether the street-side door of the second vehicle is open may be based at least in part on output data 122 indicating a door state 124 associated with the second vehicle (e.g., the other vehicle 108). If a street-side door of the first vehicle is not open, then the method 900 proceeds to operation 914, which includes performing a second action. The second action may include causing the first vehicle to maintain a current trajectory, causing the first vehicle to decelerate, associated an object cost with the second vehicle, and the like. For instance, because a door of the second vehicle is nonetheless open, a street-side door of the second vehicle may open in the near future, and the first vehicle may perform the second action and take precaution while passing the second vehicle.

If, however, a street-side door of the first vehicle is open, then the method 900 proceeds to operation 916, which includes performing a third action. The third action may include, for instance, altering a trajectory of the first vehicle to increase a distance between the first vehicle and the second vehicle. Additionally, or alternatively, the third action may include causing the first vehicle to decrease speed or stop for the second vehicle, causing the first vehicle to emit a light and/or a sound (e.g., flash the headlights, honk the horn, etc.), and/or the like. In various examples, the second action and/or the third action may include determining a predicted location of a pedestrian based at least in part on the output of the machine-learned model. In this way, the first vehicle may be controlled based at least in part on the predicted location of the pedestrian and/or the door state associated with the second vehicle.

EXAMPLE CLAUSES

A. A system comprising: one or more processors; and one or more non-transitory computer-readable media storing instructions that, when executed by the one or more processors, cause the system to perform operations comprising: receiving first image data from an image sensor associated with a first vehicle, the first image data representing an environment in which the first vehicle is operating at a first time, the environment including a second vehicle; receiving second image data from the image sensor, the second image data representing the environment at a second time after the first time; inputting the first image data and the second image data into a machine-learned model that is configured to determine a state of a door of a vehicle; receiving, from the machine-learned model, an output indicating the state of a door of the second vehicle; and controlling the first vehicle based at least in part on the output.

B. The system of paragraph A, the operations further comprising determining a predicted location of a pedestrian that is associated with the second vehicle based at least in part on the output, wherein controlling the vehicle is further based at least in part on the predicted location of the pedestrian.

C. The system of any one of paragraphs A or B, wherein the state of the door is an open state and controlling the first vehicle comprises determining that an area occupied by the door is a non-drivable area and altering a trajectory of the first vehicle to avoid the non-drivable area.

D. The system of any one of paragraphs A-C, wherein: the machine-learned model includes a first portion and a second portion, the first portion of the machine-learned model is configured to determine a first feature vector based at least in part on the first image data and determine a second feature vector based at least in part on the second image data, and the second portion of the machine-learned model is configured to determine the output based at least in part on the first feature vector and the second feature vector.

E. A method comprising receiving sensor data representing a first vehicle; inputting the sensor data into a machine-learned model that is configured to determine a state associated with a door of a vehicle; receiving, from the machine-learned model, an output indicating a door state associated with the first vehicle; and controlling a second vehicle based at least in part on the output.

F. The method of paragraph E, wherein the sensor data is first sensor data, the method further comprising: receiving second sensor data associated with the first vehicle; inputting the second sensor data into the machine learned model; and wherein the machine-learned model determines the door state associated with the first vehicle based at least in part on the first sensor data and the second sensor data.

G. The method of any one of paragraphs E or F, further comprising determining a predicted location of a pedestrian that is associated with the first vehicle based at least in part on the output, wherein controlling the second vehicle is further based at least in part on the predicted location of the pedestrian.

H. The method of any one of paragraphs E-G, wherein the door state corresponds with a door of the first vehicle being open and controlling the second vehicle comprises altering a trajectory of the second vehicle to avoid a non-drivable area occupied by the door of the first vehicle.

I. The method of any one of paragraphs E-H, further comprising associating a cost with the first vehicle based at least in part on the output, and wherein controlling the second vehicle comprises inputting an indication of the cost into a planning component of the second vehicle.

J. The method of any one of paragraphs E-I, wherein: the door state indicates whether a door of the first vehicle is open or closed, and the door of the first vehicle is at least one of a side door or a rear door.

K. The method of any one of paragraphs E-J, wherein: the machine-learned model includes a first portion that is configured to determine a feature vector based at least in part on the sensor data, and the machine-learned model includes a second portion that is configured to determine the output based at least in part on the feature vector.

L. The method of any one of paragraphs E-K, further comprising: receiving an indication of a contextual feature associated with the first vehicle, the contextual feature including one of a speed of the first vehicle, a location of the first vehicle, or an orientation of the first vehicle; inputting data indicating the contextual feature into the machine-learned model; and wherein the machine-learned model determines the door state associated with the first vehicle based at least in part on the sensor data and the data indicating the contextual feature.

M. The method of any one of paragraphs E-L, wherein the output further indicates a distance the door protrudes from the first vehicle, the method further comprising determining that the distance is less than a maximum distance in which the door is capable of protruding from the first vehicle, wherein controlling the second vehicle is further based at least in part on the maximum distance.

N. The method of any one of paragraphs E-M, wherein the door state associated with the first vehicle indicates a first state of a first door of the first vehicle and a second state of a second door of the first vehicle, the state of the first door and the state of the second door being associated with an open state, the method further comprising: receiving an indication that a pedestrian is proximate the first door at a first time; and determining a predicted location of the pedestrian at a second time based at least in part on the output, the predicted location proximate the second door.

O. One or more non-transitory computer-readable media storing instructions that, when executed by one or more processors, cause the one or more processors to perform operations comprising: receiving sensor data associated with a first vehicle; inputting the sensor data into a machine-learned model that is configured to determine a state associated with a door of a vehicle; receiving, from the machine-learned model, an output indicating a door state associated with the first vehicle; and controlling a second vehicle based at least in part on the output.

P. The one or more non-transitory computer-readable media of paragraph O, wherein the sensor data is first sensor data, the operations further comprising: receiving second sensor data associated with the first vehicle; inputting the second sensor data into the machine learned model; and wherein the machine-learned model determines the door state associated with the first vehicle based at least in part on the first sensor data and the second sensor data.

Q. The one or more non-transitory computer-readable media of any one of paragraphs O or P, the operations further comprising determining a predicted location of a pedestrian that is associated with the first vehicle based at least in part on the output, wherein controlling the second vehicle is further based at least in part on the predicted location of the pedestrian.

R. The one or more non-transitory computer-readable media of any one of paragraphs O-Q, wherein the door state corresponds with a door of the first vehicle being open and controlling the second vehicle comprises altering a trajectory of the second vehicle to avoid a non-drivable area occupied by the door of the first vehicle.

S. The one or more non-transitory computer-readable media of any one of paragraphs O-R, the operations further comprising associating a cost with the first vehicle based at least in part on the output, and wherein controlling the second comprises inputting an indication of the cost into a planning component of the second vehicle.

T. The one or more non-transitory computer-readable media of any one of paragraphs O-S, the operations further comprising: determining a contextual feature associated with the first vehicle based at least in part on the sensor data; inputting data indicating the contextual feature into the machine-learned model; and wherein the machine-learned model determines the door state associated with the first vehicle based at least in part on the sensor data and the data indicating the contextual feature.

U. A method comprising: receiving first image data from an image sensor associated with a first vehicle, the first image data representing an environment in which the first vehicle is operating at a first time, the environment including a second vehicle; receiving second image data from the image sensor, the second image data representing the environment at a second time after the first time; receiving an indication of a state of a door of the second vehicle based at least in part on at least one of the first image data or the second image data; inputting the first image data and the second image data into a machine-learned model that is being trained to determine door states associated with vehicles; receiving, from the machine-learned model, an output indicating a predicted state of the door of the second vehicle; determining a difference between the state of the door and the predicted state of the door; and altering a parameter of the machine-learned model to minimize the difference to obtain a trained machine-learned model that is configured to determine the door states associated with the vehicles.

While the example clauses described above are described with respect to one particular implementation, it should be understood that, in the context of this document, the content of the example clauses may also be implemented via a method, device, system, computer-readable medium, and/or another implementation. Additionally, any of examples A-U may be implemented alone or in combination with any other one or more of the examples A-U.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions that, when executed by the one or more processors, cause the system to perform operations comprising:
receiving a first frame of image data that was generated, at a first instance of time, by an image sensor associated with a first vehicle, the first frame representing a second vehicle in an environment in which the first vehicle is operating at the first instance of time;
receiving a second frame of image data that was generated by the image sensor at a second instance of time after the first instance of time, the second frame representing the second vehicle in the environment at the second instance of time;
inputting the first frame and the second frame into a machine-learned model that is configured to determine a state of one or more doors of the second vehicle;
receiving, from the machine-learned model, an output indicating the state of the one or more doors of the second vehicle;
determining, as an association, that a pedestrian is associated with the second vehicle;
determining, based at least in part on the state of the one or more doors of the second vehicle and the association of the pedestrian with the second vehicle, a predicted trajectory associated with the pedestrian, wherein the predicted trajectory comprises a predicted pedestrian destination proximate a door of the second vehicle; and
controlling the first vehicle based at least in part on the output and the predicted trajectory, wherein controlling the first vehicle comprises altering a trajectory associated with the first vehicle based at least in part on avoiding the pedestrian.

2. The system of claim 1, the operations further comprising determining a predicted location of the pedestrian, based at least in part on the predicted trajectory associated with the pedestrian, wherein controlling the first vehicle is further based at least in part on the predicted location of the pedestrian.

3. The system of claim 1, wherein the state of the one or more doors is an open state and controlling the first vehicle comprises determining that an area occupied by the one or more doors is a non-drivable area and altering a trajectory of the first vehicle to avoid the non-drivable area.

4. The system of claim 1, wherein:
the machine-learned model includes a first portion and a second portion,
the first portion of the machine-learned model is configured to determine a first feature vector based at least in part on the first frame of image data and determine a second feature vector based at least in part on the second frame of image data, and
the second portion of the machine-learned model is configured to determine the output based at least in part on the first feature vector and the second feature vector.

5. A method comprising:
receiving a first frame of sensor data representing a first vehicle at a first time;
receiving a second frame of sensor data representing the first vehicle subsequent to the first time;
inputting the first frame and the second frame into a machine-learned model that is configured to determine a state associated with a door of a vehicle;
receiving, from the machine-learned model, a first output indicating a door state associated with the first vehicle, wherein the door state indicates a first state of a first door of the first vehicle and a second state of a second door of the first vehicle;
receiving, from the machine-learned model, a second output indicating a pedestrian state, wherein the pedestrian state is based at least in part on:
the first state of the first door and the second state of the second door;
a determination that a pedestrian is associated with the first vehicle;
a predicted pedestrian trajectory comprising a destination proximate a door of the first vehicle; and
controlling a second vehicle based at least in part on the first output and the second output, wherein controlling the second vehicle comprises altering a trajectory associated with the second vehicle based at least in part on an avoiding route.

6. The method of claim 5, further comprising determining a predicted location of the pedestrian that is associated with the first vehicle based at least in part on at least one of the first output or the second output, wherein controlling the second vehicle is further based at least in part on the predicted location of the pedestrian.

7. The method of claim 5, wherein the door state corresponds with at least one of the first door or the second door of the first vehicle being open and controlling the second vehicle comprises altering a trajectory of the second vehicle to avoid a non-drivable area occupied by the first door or the second door of the first vehicle.

8. The method of claim 5, further comprising associating a cost with the first vehicle based at least in part on the first output or the second output, and wherein controlling the second vehicle comprises inputting an indication of the cost into a planning component of the second vehicle.

9. The method of claim 5, wherein:
the door state indicates whether the first door or the second door of the first vehicle is open or closed, and
the first door or the second door of the first vehicle is at least one of a side door or a rear door.

10. The method of claim 5, wherein:
the machine-learned model includes a first portion that is configured to determine a feature vector based at least in part on the first frame and the second frame, and
the machine-learned model includes a second portion that is configured to determine the first output based at least in part on the feature vector.

11. The method of claim 5, further comprising:
receiving an indication of a contextual feature associated with the first vehicle, the contextual feature including one of a speed of the first vehicle, a location of the first vehicle, or an orientation of the first vehicle;
inputting data indicating the contextual feature into the machine-learned model; and
wherein the machine-learned model determines the door state associated with the first vehicle based at least in part on the first frame, the second frame, and the data indicating the contextual feature.

12. The method of claim 5, wherein the first output further indicates a distance the first door or the second door protrudes from the first vehicle, the method further comprising determining that the distance is less than a maximum distance in which the first and/or second door is capable of protruding from the first vehicle, wherein controlling the second vehicle is further based at least in part on the maximum distance.

13. The method of claim 5, wherein the state of the first door and the state of the second door are associated with an open state, the method further comprising:
receiving an indication that the pedestrian is proximate the first door in at least one of the first frame or the second frame; and
determining a predicted location of the pedestrian at a second time based at least in part on the first output, the predicted location proximate the second door.

14. The method of claim 5, further comprising:
determining a predicted trajectory of a pedestrian based at least in part on the door state associated with the first vehicle; and
controlling the second vehicle based at least in part on the predicted trajectory of the pedestrian.

15. One or more non-transitory computer-readable media storing instructions that, when executed by one or more processors, cause the one or more processors to perform operations comprising:
receiving a first frame of sensor data representing a first vehicle at a first time;
receiving a second frame of sensor data representing the first vehicle subsequent to the first time;
inputting the first frame and the second frame into a machine-learned model that is configured to determine a door state associated with one or more doors of the first vehicle;
receiving, from the machine-learned model, a first output indicating the door state associated with the first vehicle;
receiving, from the machine-learned model, a second output indicating a determination that a pedestrian is associated with the first vehicle;
determining, based at least in part on the first output indicating the door state, the second output indicating a pedestrian, and a predicted trajectory comprising a predicted pedestrian destination, an indication of a non-drivable area, and
controlling a second vehicle based at least in part on the first output and the indication of the non-drivable area, wherein controlling the second vehicle comprises altering a trajectory associated with the second vehicle based at least in part on avoiding the non-drivable area.

16. The one or more non-transitory computer-readable media of claim 15, the operations further comprising determining a predicted location of a pedestrian that is associated with the first vehicle based at least in part on the first output, wherein controlling the second vehicle is further based at least in part on the predicted location of the pedestrian.

17. The one or more non-transitory computer-readable media of claim 15, wherein the door state corresponds with a door of the first vehicle being open, the non-drivable area corresponds to an area occupied by the door of the first vehicle, and controlling the second vehicle comprises altering a trajectory of the second vehicle to avoid the non-drivable area.

18. The one or more non-transitory computer-readable media of claim 15, the operations further comprising associating a cost with the first vehicle based at least in part on the first output, and wherein controlling the second vehicle comprises inputting an indication of the cost into a planning component of the second vehicle.

19. The one or more non-transitory computer-readable media of claim 15, the operations further comprising:
determining a contextual feature associated with the first vehicle in addition to the sensor data;

inputting data indicating the contextual feature into the machine-learned model; and wherein the machine-learned model determines the door state associated with the first vehicle based at least in part on the first frame, the second frame, and the data indicating the contextual feature.

20. The one or more non-transitory computer-readable media of claim 15, the operations further comprising determining a predicted trajectory of the first vehicle at a future time based at least in part on the door state associated with the first vehicle.

* * * * *